US008606339B2

(12) United States Patent
Miyata et al.

(10) Patent No.: US 8,606,339 B2
(45) Date of Patent: Dec. 10, 2013

(54) MOBILE COMMUNICATION TERMINAL

(75) Inventors: Yusuke Miyata, Higashihiroshima (JP); Yonosuke Amano, Higashihiroshima (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 1013 days.

(21) Appl. No.: 11/597,957

(22) PCT Filed: May 30, 2005

(86) PCT No.: PCT/JP2005/009868
§ 371 (c)(1),
(2), (4) Date: Nov. 29, 2006

(87) PCT Pub. No.: WO2005/117400
PCT Pub. Date: Dec. 8, 2005

(65) Prior Publication Data
US 2007/0298850 A1    Dec. 27, 2007

(30) Foreign Application Priority Data

May 31, 2004  (JP) ................................. 2004-161225
Nov. 2, 2004   (JP) ................................. 2004-318856
Nov. 2, 2004   (JP) ................................. 2004-318857

(51) Int. Cl.
  *H04M 1/00*  (2006.01)
(52) U.S. Cl.
  USPC ..................... 455/575.3; 455/575.1; 379/330
(58) Field of Classification Search
  USPC ............ 455/575.1, 425, 557, 575.3; 379/185, 379/330
  See application file for complete search history.

(56) References Cited

U.S. PATENT DOCUMENTS

| 5,258,748 | A  | * | 11/1993 | Jones ............................. 345/172 |
| 5,797,089 | A  | * | 8/1998  | Nguyen ......................... 455/403 |
| 5,966,647 | A  | * | 10/1999 | Sawai ............................ 455/300 |
| 6,434,404 | B1 | * | 8/2002  | Claxton et al. ............. 455/575.3 |
| 6,850,784 | B2 | * | 2/2005  | SanGiovanni ............. 455/575.1 |
| 6,900,981 | B2 | * | 5/2005  | Kuivas et al. ............ 361/679.06 |

(Continued)

FOREIGN PATENT DOCUMENTS

| JP | 4-104640 A | 4/1992 |
| JP | 11-30226 A | 2/1999 |

(Continued)

*Primary Examiner* — Phuoc Doan
(74) *Attorney, Agent, or Firm* — Birch, Stewart, Kolasch & Birch, LLP

(57) ABSTRACT

[Summary]
[Object]
An object of the present invention is to enhance operability of a mobile communication terminal to be foldable by directing a display panel outward.
[Means for Settlement]
A folding-type mobile communication terminal including a thin operation case 1 with an operation panel being formed, a thin display case 2 with a display panel being formed, and a movable connector 3 to connect the operation case 1 and the display case 2, in which transition can be made between a normal open state of expanding the both cases 1 and 2 by directing the operation panel and the display panel to the same direction, and a reverse close state of being folded by directing the display panel outward and opposing the main surfaces of the both cases, and having a main multifunction key 14 to be provided in the operation panel and capable of performing two or more different operation inputs corresponding to pressing portions, and a side multifunction key 26 to be provided in the end surface of the operation case 1 and capable of performing the same operations with the main multifunction key 14 to achieve the same operation inputs therewith.

3 Claims, 30 Drawing Sheets

(56) References Cited

U.S. PATENT DOCUMENTS

| | | | |
|---|---|---|---|
| 6,957,083 B2 * | 10/2005 | Ikeda et al. | 455/556.1 |
| 7,162,030 B2 * | 1/2007 | Bell et al. | 379/433.13 |
| 7,197,332 B2 * | 3/2007 | Andersson et al. | 455/557 |
| 2001/0004269 A1 | 6/2001 | Shibata et al. | |
| 2004/0116167 A1 | 6/2004 | Okuzako et al. | |
| 2005/0190160 A1 * | 9/2005 | Wang et al. | 345/168 |
| 2006/0183512 A1 * | 8/2006 | Segawa et al. | 455/575.1 |

FOREIGN PATENT DOCUMENTS

| | | |
|---|---|---|
| JP | 2001-136251 A | 5/2001 |
| JP | 2001-169166 A | 6/2001 |
| JP | 2001-251406 A | 9/2001 |
| JP | 2001-285442 A | 10/2001 |
| JP | 2002-33809 A | 1/2002 |
| JP | 2002-033809 A | 1/2002 |
| JP | 2002-118644 A | 4/2002 |
| JP | 2002-185600 A | 6/2002 |
| JP | 2002-287850 A | 10/2002 |
| JP | 2003-134204 A | 5/2003 |
| JP | 2003-309634 A | 10/2003 |
| JP | 2003-316496 A | 11/2003 |
| JP | 2003-333149 A | 11/2003 |
| JP | 2004-80776 A | 3/2004 |
| JP | 2004-080776 A | 3/2004 |

* cited by examiner (a) (b)

MOBILE COMMUNICATION TERMINAL

TECHNICAL FIELD

The present invention relates to a mobile communication terminal, more specifically, a mobile communication terminal having a display case provided with a display panel and an operation case provided with an operation panel, and relates to improvement of a folding-type mobile telephone for example. The present invention particularly relates to a mobile communication terminal with enhanced operability in a reverse close state of being folded by directing the display panel outward.

BACKGROUND ART

There is a demand for a mobile telephone to be further miniaturized and reduced in weight from the aspect of mobility enhancement. However, the extent to miniaturize operation keys is limited in consideration with operability. In addition, there is a demand for enlargement of the screen size in a main display. In order to make these opposing demands to be compatible from each other, a foldable mobile telephone has become a mainstream in recent years, in which a display case provided with a main display is connected to an operation case provided with operation keys by a hinge so as to be folded by mutually opposing a display panel including the main display and an operation panel including the operation keys.

There are various kinds of mobiles phones proposed, in which not only a first rotating axis for folding but also a two-axis hinge with a second rotating axis orthogonal to the first rotating axis are used to realize relative rotatability of the operation case and the display case using the second rotating axis as a center (ex. Patent Document 1). In such the mobile telephones, the cases can be folded by directing the display panel outward, so that the user also can browse the main display in a folded and miniaturized state.

However, in a reverse close state of being folded by directing the display panel outward, the operation panel is directed to the inside of the folded cases, so that it is impossible for the user to perform a key operation. Therefore, proposed is a conventional mobile telephone in which an operation input can be made in the reverse close state (ex. Patent Documents 2 and 3). Patent Document 2 discloses a mobile telephone provided with an operation input means on the display panel. Patent Document 3 discloses a mobile telephone provided with the operation input means in the side surface of the operation case.

Further, in a mobile telephone of recent years, a multifunction key capable of performing two or more different operation inputs corresponding to pressing portions is arranged on the operation panel. This kind of multifunction key is capable of performing four kinds of operation inputs of up, low, left and right in many cases, and called a direction key, a cross key or the like, which contributes miniaturization and operability enhancement of the operation panel (ex. Patent Document 4). Patent Document 4 discloses a mobile telephone provided with two multifunction keys, or more specifically a multifunction key operated in an expanded state of the cases and a multifunction key operated in a folded state.

Patent Document 1: Japanese Unexamined Patent Publication No. H11(1999)-30226
Patent Document 2: Japanese Unexamined Patent Publication No. 2001-251406
Patent Document 3: Japanese Unexamined Patent Publication No. 2002-33809
Patent Document 4: Japanese Unexamined Patent Publication No. 2002-118644

DISCLOSURE OF THE INVENTION

Problems to be Solved by the Invention

In the mobile telephone described in Patent Document 2, the respective operation keys provided on the display panel are made to be a key to perform a single operation input by pressing. Therefore, in order to enable various kinds of operation inputs in the reverse close state, the number of the operation keys provided on the display panel needs to be increase. However, there is no sufficient space for the key arrangement on the display panel, so that the increase of the number of the operation keys causes a problem of reduction of an image region on the display panel or enlargement of the display case.

In the mobile telephone of Patent Documents 2 and 3, the operation key used in the reverse close state is different from the operation key used in the expanded state of the cases, resulting in a problem that the operation method is difficult for the user to understand.

In the mobile telephone of Patent Documents 2 and 3, there is also a problem that an erroneous operation is easily generated. For example, in the case of Patent Document 2, there is a problem that an operation input which is not intended by the user is easily made by coming into contact with an ear or face of the user during a telephone call. A telephone call receiver is generally provided in the display panel, so that the telephone call usually is made in a terminal state in which the both cases are expanded by directing the display panel and the operation panel to the same direction (normal open state). It is considered that, if an ear of the user or the like is made into contact with the operation keys on the display panel during the telephone call in the normal open state as stated above, the erroneous operation is generated. Also, in the case of Patent Document 3, there is problem that an operation input which is not intended by the user is easily made by dropping and touching the mobile telephone, or coming into contact with the user's hand holding the mobile communication terminal.

Meanwhile, in the mobile telephone described in Patent Document 4, one of the multifunctional keys is provided on the operation panel, and the remaining multifunction key is provided on the display case in the opposite side of the main display. Therefore, it is impossible for the user who is browsing the main display in the reverse close state to use any multifunction keys, which is problematic.

The present invention was achieved by considering the above problems, and an object thereof is to improve operability of a mobile communication terminal which is capable of making transition between the normal open state with the both cases being expanded by directing the display panel and the operation panel to the same direction, and the reverse close state with the both cases being folded by directing the operation panel inward and the display panel outward.

Also, an object of the present invention is to provide a mobile communication terminal to be capable of performing the same operation inputs at the time of being folded and at the time of being expanded. Further, an object of the present invention is to further provide a mobile communication terminal to be capable of suppressing an operation input against intentions of the user.

Also, an object of the present invention is to provide a mobile communication terminal in which operability is enhanced in the reverse close state while suppressing the increase of the size of the display panel. Moreover, an object of the present invention is to provide a mobile communication terminal to be capable of suppressing the erroneous operation in the normal operation state, and particularly the erroneous operation during the telephone call in the normal open state.

Furthermore, an object of the present invention is to improve operability of an imaging device in which two thin cases are connected by a hinge portion.

Means for Solving the Problems

A first aspect of the present invention is a mobile communication terminal in a configuration to have a display case provided with the display panel, the operation case provided with an operation panel, and a movable connector to connect the display case and the operation case to be foldable, and to be capable of making transition between the normal open state of expanding the both cases by directing the display panel and the operation panel to the same direction, and the reverse close state of folding the both cases by directing the display panel outward and the operation panel inward, including a first multifunction key to be provided on the operation panel and capable of performing two or more different operation inputs corresponding to pressing portions, a second multifunction key to be operable in the reverse close state and capable of performing two or more different operation inputs corresponding to pressing portions, and an input control means in which activation and inactivation of said operation inputs by the second multifunction key are controlled in accordance with the normal open state and the reverse close state.

Due to this configuration, it is possible to use the first multifunction key in the normal open state and use the second multifunction key in the reverse close state. Accordingly, the user can use the multifunction key in either cases of the normal open state and the reverse close state, so that operability of the folding-type mobile communication terminal can be enhanced. Also, the input control means controls activation and inactivation of the operation inputs by the second multifunction key in accordance with the normal open state and the reverse close state, so that the erroneous operation to operate the second multifunction key against intentions of the user can be suppressed.

A second aspect of the present invention is a mobile communication terminal with the second multifunction key provided in the side surface of the operation case, in addition to the configuration described above. Due to this configuration, the user can operate the multifunction key even in the reverse open state without increasing the size of the display panel.

A third aspect of the present invention is a mobile communication terminal with the second multifunction key arranged on the display panel in addition to the configuration stated above. Due to this configuration, the user can operate the second multifunction key even in the reverse open state. Particularly due to the arrangement of the second multifunction key on the display panel, the multifunction key can be arranged to oppose to the user in the reverse open state in the same manner with the first multifunction key in the normal open state so that operability can be improved more.

A fourth aspect of the present invention is a mobile communication terminal in a configuration to have a terminal state detection means for detecting the connection state of the both cases made by the movable connector in addition to the configuration described above, so that the input control means controls activation and inactivation of operation inputs by the first and the second multifunction keys on the basis of the detected result of the terminal state detection means. Due to this configuration, activation and inactivation of operation inputs by the first and the second multifunction keys are controlled in accordance with the normal open state and the reverse close state, thereby the erroneous operation can be suppressed. For example, the first multifunction key is activated and the second multifunction key is inactivated in the normal open state, while the first multifunction key is inactivated and the second multifunction key is activated in the reverse close state.

A fifth aspect of the present invention is a mobile communication terminal in a configuration to have a thin display case with a display panel formed on one main surface thereof, a thin operation case with an operation panel formed on one main surface thereof, and a movable connector to connect the display case and the operation case, and to be capable of making transition between a normal open state of expanding the both cases by directing the operation panel and the display panel to the same direction, and a reverse close state of folding the both cases with mutually opposing main surfaces by directing the operation panel inward and the display panel outward, including a main multifunction key to be disposed on the operation panel and capable of performing two or more different operation inputs corresponding to pressing portions, and a side multifunction key to be provided on the end surface of the operation case and capable of performing the same operations with the main multifunction key to achieve the same operation inputs therewith.

Due to this configuration, the user can perform various kinds of operation inputs even in the reverse close state by operating the side multifunction key provided in the end surface of the operation case. Also, the same operations with the main multifunction key are performed in the side operation key to achieve the same operation inputs with the main multifunction key, so that operation methods are integrated at the time of expanding and folding the cases, resulting in no need for the user to remember the operation methods for the respective terminal states, and easy understanding and learning of the operation method can be realized.

A sixth aspect of the present invention is a mobile communication terminal in a configuration to enable that the side multifunction key performs the same operations with the main multifunction key to achieve the same operation inputs therewith in both a short keypress and a long keypress, in addition to the configuration stated above. Due to this configuration, even if an operation input in the same key operation is differentiated by the short keypress and the long keypress, it is possible for the user to easily understand and learn the operation method.

A seventh aspect of the present invention is a mobile communication terminal in a configuration to have a terminal state detection means to detect the connection state between the both cases made by the movable connector, and an input control means to inactivate the operation inputs by the side multifunction key on the basis of the detected result by the terminal state detection means, in addition to the configuration described above, in which the side multifunction key is provided in the movable connector side of the operation case, and the input control means inactivates the operation inputs by the side multifunction key in the normal open state.

Due to the arrangement of the side multifunction key in the movable connector side of the operation case, if transition was made from the normal open state to the reverse close state, the user can obtain satisfactory operability in the side multifunction key without changing the way to hold the mobile communication terminal. In this case, there is a high possibility that the erroneous operation is made by the user in the side multifunction key during the telephone communication or the like in the normal open state, but the erroneous operation in the side operation key can be suppressed by inactivating an operation input by the side multifunction key in the normal open state.

An eighth aspect of the present invention is a mobile communication terminal in a configuration to realize that the input control means inactivates an operation by the side multifunction key during the telephone call in the normal open state, in addition to the configuration stated above. Due to this configuration, the erroneous operation can be suppressed by inactivating an operation of the side function key during the telephone call in the normal open state in which the erroneous operation is easily generated in particular and an effect thereof is large.

A ninth aspect of the present invention is a mobile communication terminal in a configuration to have the movable connector provided with a first rotating axis for folding the both cases and a second rotating axis which is orthogonal to the first rotating axis and relatively rotates the both cases, in which transition can be made to the reverse open state of expanding the both cases by directing the operation panel and the display panel to the opposite directions, and the input control means activates the operation inputs by the side multifunction key in the reverse close state and the reverse open state, in addition to the configuration stated above. Due to this configuration, the operation panel and the display panel are directed to opposite sides from each other, so that the user can use the multifunction key while browsing the display panel even in the reverse open state in which the keys on the operation panel is difficult to operate, in the same manner with the case of the reverse close state.

A tenth aspect of the present invention is a mobile communication terminal in a configuration to have two or more main guide keys to be provided on the operation panel and have function assignment displayed in the display screen on the display panel, a sub guide key to be provided in the end surface of the operation case and made to correspond to a part of the main guide keys, and a sub guide key to be provided on the display panel and made to correspond to the remaining part of the main guide keys, in addition to the configuration stated above. Due to this configuration, an operation input can be performed by the guide key in the reverse close state.

An eleventh aspect of the present invention is a mobile communication terminal to have the main guide keys including a center guide key arranged in a center of the main multifunction key, in which the side guide key corresponding to the center guide key is arranged in the vicinity of the side multifunction key, in addition to the configuration stated above. Due to this configuration, it is possible to miniaturize the side multifunction key and make the operation case thinner without significantly decreasing operability.

A twelfth aspect of the present invention is a mobile communication terminal in a configuration to have a terminal state detection means to detect the connecting state of the both cases by the movable connector, and an input control means to inactivate an operation input by the side guide key in the normal open state on the basis of the detected result by the terminal state detection means, in addition to the configuration stated above.

A thirteenth aspect of the present invention is a mobile communication terminal in a configuration to have an on-hook function assigned to the sub guide key during the telephone call in the reverse close state, in addition to the configuration stated above. Due to this configuration, it is possible to finish the telephone call in the reverse close state without making any changes. The erroneous operation in the on-hook key can also be suppressed during the telephone call in the reverse close state.

A fourteenth aspect of the present invention is a mobile communication terminal in a configuration to have an off-hook function assigned to the sub guide key during an incoming telephone call in the reverse close state, in addition to the configuration stated above. Due to this configuration, it is possible to start the telephone call in the reverse close state without making any changes.

A fifteenth aspect of the present invention is a mobile communication terminal in a configuration to have an off-hook function assigned to the sub guide key in the case of making transition to the reverse close state after inputting a number in the normal open state, in addition to the configuration stated above. Due to this configuration, the telephone call can be started by making the telephone call from the reverse close state.

A sixteenth aspect of the present invention is to a mobile telephone in a configuration to have a display case provided with a display panel including a display screen, an operation case provided with an operation panel comprised of operation keys, and a connector to connect the display case and the operation case to be foldable, and to be capable of making transition between the normal open state of expanding the both cases by directing the display panel and the operation panel to the same direction, and the reverse close state of folding the both cases by directing the operation panel inward and the display panel outward, including the first multifunction key to be provided on the operation panel and capable of performing two or more different operation inputs corresponding to pressing portions, and the second multifunction key to be provided on the display panel and capable of performing two or more different operation inputs corresponding to pressing portions.

Due to this configuration, the user can operate the multifunction key while browsing the display screen in either of the normal open state and the reverse open state. That is, it is possible to use the first multifunction key on the operation panel in the normal open state, and use the second multifunction key on the display panel in the reverse close state. Accordingly, operability is improved in the reverse close state without increasing the number of the operation keys provided on the display panel.

A seventeenth aspect of the present invention is a mobile telephone in a configuration to enable that the second multifunction key performs the same operations with the first multifunction key to achieve the same operation inputs therewith, in addition to the configuration stated above. Due to this configuration, operation methods are integrated in the normal open state and the reverse open state, resulting in no need for the user to remember the operation methods for the respective terminal states, and easy understanding and learning of the operation method are realized.

An eighteenth aspect of the present invention is a mobile telephone in a configuration to have a terminal state identification means to identify the normal open state and the reverse close state, and an input control means to control activation and inactivation of the operation inputs by the first or second multifunction keys on the basis of the identified result of the terminal state identification means, in addition to the configuration stated above. Due to this configuration, the activation and the inactivation of the operation input by the first and second multifunction keys are controlled in accordance with the terminal states, so that the erroneous operation in the multifunction key is suppressed. An object to control activation and inactivation may be either one of the first and second multifunction keys, or both of them.

A nineteenth aspect of the present invention is a mobile telephone in a configuration to have a receiver for outputting voice during the telephone call on the display panel in addition to the configuration stated above, in which the input control means activates the operation inputs by the first multifunction key and inactivates the operation inputs by the second multifunction key in the normal open state. According to this configuration, the erroneous operation in the second multifunction key is prevented in the normal open state. The erroneous operation during the telephone call is easily generated particularly because the second multifunction key is disposed on the display panel in which the telephone call receiver is provided. Therefore, an operation input by the second multifunction key is inactivated in the normal open state, so that it is possible to prevent the erroneous operation generated in the second multifunction key during the telephone call in the normal open state.

A twentieth aspect of the present invention is a mobile telephone in a configuration that the input control means inactivates the operation inputs by the second multifunction key during the telephone call in the normal open state, in addition to the configuration stated above. Due to this configuration, it is possible to prevent the erroneous operation by the second multifunction key during the telephone call in the normal open state.

A twenty-first aspect of the present invention is a mobile telephone to have the second multifunction key provided in the opposite side of the connector in the external side of the display screen, in addition to the configuration stated above. Due to this configuration, the second multifunction key is disposed in front of the display screen for the user in the reverse close state, so that the user can perform an operation input using the multifunction key arranged in front of the display screen in either of the terminal states including the normal open state and the reverse close state. Accordingly, satisfactory operability of the multifunction key can be obtained in either of the terminal states, and an operation in the multifunction key does not interrupt browsing in the display screen.

A twenty-second aspect of the present invention is a mobile telephone in a configuration to include two or more first guide keys to be provided on the operation panel and have function assignment displayed on the display screen, and a second guide key to be provided on the display panel and made to correspond to the first guide key in addition to the configuration stated above, in which the input control means controls activation and inactivation of the operation input by the first and second guide keys on the basis of the identified result by the terminal state identification means. Due to this configuration, the operation input by the guide key can be made in either of the normal open state and the reverse close state.

A twenty-third aspect of the present invention is a mobile telephone in a configuration to have two back lights to illuminate the first and second multifunction keys from the rear surface side respectively, and a key lighting control means to turn on the back light on the basis of the identified result by the terminal state identification means, in addition to the configuration described above. Due to this configuration, the back light is turned on the basis of the terminal state, and the multifunction key corresponding to the terminal state is illuminated, so that it is possible to visually notify the user of the multifunction key which is capable of performing an operation input.

A twenty-fourth aspect of the present invention is a mobile telephone in a configuration that the key lighting control means turns on the back light corresponding to the multifunction key made to activate the operation inputs and turns off the back light corresponding to the multifunction key made to inactivate the operation inputs, in addition to the configuration stated above. Due to this configuration, key illumination is made by corresponding to the switch of the multifunction keys, so that the user can easily recognize the activated multifunction key.

A twenty-fifth aspect of the present invention is a mobile telephone in a configuration to include a back light to illuminate the second multifunction key from the rear surface side, and a key lighting control means to turn on the back light by switching illumination colors on the basis of the identified result of the terminal state, in addition to the configuration stated above. Due to this configuration, illumination colors by the back light are switched on the basis of the terminal state, so that illumination colors for the second multifunction key can be differentiated depending on the terminal state. Therefore, the user can easily recognize the activated multifunction key by the illumination colors.

A twenty-sixth aspect of the present invention is an imaging device in a configuration of having the first thin case and the second thin case being connected by a hinge portion, in which the first thin case has an imaging means and an operation panel with the first operation key to control the imaging means, while the second thin case has a display panel with the display screen formed to display image data taken by the imaging means, and the second operation key to control the imaging means, and the hinge portion rotatably connects the first and the second thin cases in such a manner that transition can be made between a folded state of mutually opposing a main surface of the first thin case and a main surface of the second thin case, and an expanded state.

A twenty-seventh aspect of the present invention is an imaging device with the second operation key provided on the display panel, in addition to the configuration stated above.

A twenty-eighth aspect of the present invention is an imaging device with the operation panel which is either of main surfaces of the first thin case, in addition to the configuration stated above.

A twenty-ninth aspect of the present invention is an imaging device with the operation panel formed in the end surface of the first thin case, in addition to the configuration stated above.

A thirtieth aspect of the present invention is an imaging device in a configuration to have the display panel which is either of main surfaces of the second thin case, and the hinge portion including two orthogonal rotating axes, in which transition can be made between a folded state with the display panel directed inward and a folded state with the display panel directed outward, in addition to the configuration stated above.

A thirty-first aspect of the present invention is an imaging device in a configuration to have the imaging means formed on either of main surfaces of the first thin case, and the display panel which is either of main surfaces of the second thin case, in which the hinge portion is capable of folding the both cases so as to turn the imaging means and the display panel toward outside, in addition to the configuration stated above.

A thirty-second aspect of the present invention is an imaging device in which end portions of the first and second thin cases in the opposite side of the removable connector are mutually piled in the folded state, and the second operation key is formed in the end portion side rather than the display screen, in addition to the configuration stated above.

A thirty-third aspect of the present invention is an imaging device with the first operation key formed in the end surface of the first thin case, in addition to the configuration stated above.

A thirty-fourth aspect of the present invention is a mobile communication terminal in which the imaging device is provided with the telephone communication receiver to output received voice, the telephone communication microphone which transmission voice is inputted into, and a third operation key to input a telephone number, and configured to enable the telephone communication via a cellular wireless base station.

Effect of the Invention

The mobile communication terminal according to the first to the fifteenth aspects of the present invention has the first multifunction key on the operation panel, while having the second multifunction key which is operable in the reverse close state of being folded with the display panel directed outward. Therefore, it is possible to use the first multifunction key in the normal open state of being expanded by directing the operation panel and the display panel to the same direction, and use the second multifunction key in the reverse close state, so that operability of the mobile communication terminal can be enhanced.

Particularly because the second multifunction key is provided in the movable connector side on the end surface of the operation case, in the case of making transition from the normal open state to the reverse close state, it is possible for the user to obtain satisfactory operability in the second multifunction key without changing the way to hold the mobile communication terminal. Meanwhile, due to the arrangement of the second multifunction key on the display panel, the multifunction key can be opposed to the user even in the reverse open state in the same manner with the first multifunction key in the normal open state, so that satisfactory operability can be obtained in the second multifunction key.

Also, in the mobile communication terminal of the first to the fifteenth aspects of the present invention, activation and inactivation of an operation input by the second multifunction key are controlled in accordance with the normal open state and the reverse close state. It is therefore possible to suppress the erroneous operation to operate the second multifunction key against intentions of the user. It is further possible to suppress the erroneous operation to operate the first multifunction key against intentions of the user by controlling activation and inactivation of an operation input by the first and second multifunction keys on the basis of the connection state of the both cases.

Moreover, in the mobile communication terminal of the first to the fifteenth aspects of the present invention, the second multifunction key is capable of performing the same operations with the first multifunction key to achieve the same operation inputs therewith. Therefore, operation methods can be integrated between the normal open state and the reverse close state, resulting in no need for the user to remember the operation methods for the respective terminal states, and easy understanding and learning of the operation method can be realized.

Furthermore, in the mobile communication terminal of the first to the fifteenth aspects of the present invention, the sub guide key provided on the display panel enables to enhance operability in the mobile communication terminal which is foldable by directing the display panel outward. That is, the same operation inputs can also be made in the guide key in both states of the normal open state and the reverse close state.

In the mobile communication terminal of the sixteenth to the twenty-fifth aspects of the present invention, the first multifunction key is provided on the operation panel, while the second multifunction key is provided on the display panel. It is therefore possible for the user to use the multifunction key while browsing the display screen on the display panel in either cases of the normal open state and the reverse open state. That is, various kinds of operation inputs are made possible in the reverse open state while suppressing the increase of the number of the operation keys on the display panel and enlargement of the display panel accompanied thereby.

Also, in the mobile communication terminal of the sixteenth to the twenty-fifth aspects of the present invention, the same operations with the first multifunction key are made in the second multifunction key to achieve the same inputs therewith. Therefore, operation methods can be integrated between the normal open state and the reverse close state, resulting in no need for the user to remember the operation methods for the respective terminal states, and easy understanding and learning of the operation method can be realized.

Moreover, in the mobile communication terminal of the sixteenth to the twenty-fifth aspects of the present invention, the activation and the inactivation of the operation input by the first and second multifunction keys are controlled on the basis of the terminal state. Therefore, it is possible to suppress the erroneous operation while enhancing operability in the normal open state and the reverse open state by switching the two multifunction keys in accordance with the terminal state. Particularly because of inactivating the operation input by the second multifunction key during the telephone call in the normal open state, the erroneous operation can be prevented during the telephone call in the normal open state.

Furthermore, in the mobile communication terminal of the sixteenth to the twenty-fifth aspects of the present invention, the back light is turned on based on the terminal state to illuminate the multifunction key corresponding to the terminal state. Therefore, it is possible to visually notify the user of the multifunction key in which operation input can be made, so that the user can easily recognize the multifunction key to be activated.

Meanwhile, in the imaging device of the twenty-sixth to the thirty-third aspects of the present invention, the first thin case provided with the imaging means is rotatably connected to the second thin case provided with the display screen by the hinge portion, so that transition can be made between the folded state with the mutually opposing main surfaces of the both thin cases and the expanded state. Also, the first operation key is provided in the first thin case, and the second operation key is provided in the second thin case. Therefore, the imaging means can be controlled by using the operation key with satisfactory operability in accordance with the connection state of the both thin cases, enabling enhancement of operability in the imaging device.

BEST MODE FOR CARRYING OUT THE INVENTION

First Embodiment

FIG. 1 is a diagram showing an example of a mobile communication terminal according to a first embodiment of the present invention, in which appearance of a foldable mobile telephone 100 in a normal open state is exhibited. The open normal state is the most basic terminal state when the mobile telephone 100 is used, and FIG. 1a shows a front view of the mobile telephone 100 in the normal open state to be seen from a user side, while FIG. 1b shows a left side view thereof.

The mobile telephone 100 is comprised of an operation case 1, a display case 2 and a movable connector 3. Both the operation case 1 and the display case 2 are a thin case with the shape of a substantially rectangular plate respectively, having two mutually opposing main surfaces and end surfaces respectively. That is, there are two parallel maximum plane surfaces and end surfaces in the case of using one of the maximum plane surfaces as a front surface. The operation case and the display case are connected in the respective one short side by the movable connector 3, and the both cases 1 and 2 can be relatively rotated by using a first rotating axis A1 and a second rotating axis A2 as a center.

To be more specific, if the display case 2 is rotated using the first rotating axis A1 as a center while the operation case 1 is fixed, it is possible to fold the both cases 1 and 2 by mutually opposing the main surfaces thereof or to expand. If the display case 2 is rotated by 180 degrees using the first rotating axis A1 as a center while the operation case 1 is fixed, it is possible to bring the state that the display case 2 is turned over to the operation case 1.

Operation keys (main operation keys) such as a ten-key 10, main guide keys 11 to 13, a main multifunctional key 14, an off-hook key 15, an on-hook key 16, and a main clear key 17 are arranged in one main surface of the operation case 1, and the main surface is used as an operation panel mainly by the user to perform operation inputs. A telephone call microphone 18 is also arranged on the operation panel in the vicinity of the end portion of the case in the opposite side of the movable connector 3.

A main display 20 comprised of a liquid crystal display device is arranged in one main surface of the display case 2, and the main surface is used as a display panel to output displays to mainly the user. Telephone call receivers 21 and 22 and sub guide keys 23 and 24 are also arranged on the display panel.

FIG. 2 is a diagram showing an example of the internal mechanical structure of the mobile telephone 100 of FIG. 1, in which a main portion of the movable connector 3 is exhibited along with terminal state detection sensors 40 to 43. The movable connector 3 includes bearing members 30 and 31 fixed to the operation case 1, a rotating member 32 rotatably held by the bearing members 30 and 31, a flame member 33 fixed to the display case 2, and a rotating connector member 34 to rotatably connect the rotating member 32 and the flame member 33.

To be more specific, the movable connector 3 is comprised of a two-axis hinge to relatively rotate the operation case 1 and the display case 2 using the first rotating axis A1 and the second rotating axis A2 as a center. If the display case 2 is rotated by the bearing members 30 and 31 and the rotating member 32 using the first rotating axis A1 as a center, an opening/closing operation can be made in the mobile telephone 100. Accordingly, if the display case 2 is folded by bringing down toward the user side from the normal open state, the length in the longitudinal direction is substantially halved, enabling compact storage.

It is also possible to rotate the display case 2 by the rotating connector member 34 using the second rotating axis A2 as a center. The second rotating axis A2 is orthogonal to the first rotating axis A1, and if the display case 2 is rotated by 180 degrees using the second rotating axis A2 as a center, directions of the operation case 1 and the display case 2 can be differentiated.

Magnets 40 and 42, and magnetic sensors 41 and 43 in FIG. 2 are a sensor to detect a connection state (referred to as a terminal state in the present specification) of the both cases made by the movable connector 3, and details thereof will be described below.

FIG. 3 is a diagram showing appearance of the mobile telephone 100 of FIG. 1 in a normal close state. The normal close state is the most basic terminal state at the time of storing the mobile phone, and a folded state in which the display case 2 is rotated using the first rotating axis A1 as a center from the normal open state so that the display panel and the operation panel are turned inside and mutually opposed. The operation case 1 and the display case 2 are formed to have a size in which the respective end portions are mutually piled in the opposite side of the movable connector 3 in the folded state. FIG. 3*a* is a front view of the mobile telephone 100 in the normal close state to be seen from the user side, and FIG. 3*b* is a left side view thereof. In the main surface disposed in the opposite side of the display panel of the display case 2, a sub display 51 which is smaller than the main display 20 is provided.

FIG. 4 is a diagram showing appearance of the mobile telephone 100 of FIG. 1 in a reverse open state. The reverse open state is a terminal state to take a shot of mainly the user with a camera by himself, and an expanded state in which the display case 2 is rotated by 180 degrees using the second rotating axis as a center from the normal open state so that the display panel and the operation panel are directed to the opposite directions. The reverse open state is used in a laterally extended state by rotating the mobile telephone 90 degrees. FIG. 4*a* is a front view of the mobile telephone 100 in the reverse open state to be seen from the user side, and FIG. 4*b* is a bottom view thereof. In a main surface of the operation case 1 in the opposite side of the operation panel, there is provided a mobile light 53.

FIG. 5 is a diagram showing the state of rotating the mobile telephone 100 of FIG. 1 using the second rotating axis A2 as a center. In the normal close state or the normal open state, it is impossible to rotate the display case 2 using the second rotating axis A2 as the center. Therefore, the first rotating axis A1 is initially used as a center to rotate, so that the position is shifted to an intermediate state therebetween. The display case 2 is then rotated by 180 degrees using the second rotating axis A2 as a center. If the both cases 1 and 2 are expanded thereafter, the reverse open state as shown in FIG. 4 is exhibited, while a reverse close state to be described below will be exhibited if the both cases 1 and 2 are closed.

FIG. 6 is a diagram showing appearance of the mobile telephone 100 of FIG. 1 in the reverse close state. The reverse close state is a terminal state to take a shot of mainly the user with a camera by himself, and a folded state in which the display case 2 is rotated using the first rotating axis A1 as a center from the reverse open state to direct the operation panel inward and the display panel outward. FIG. 6*a* is a front view of the mobile telephone 100 in the reverse close state to be seen from the user side, and FIG. 6*b* is a left side view thereof. The reverse close state is a state to make the mobile telephone compact as a whole while enabling to browse the main display 20, so that it is possible make the telephone call or execute various kinds of application programs in addition to a camera shot.

Explained next will be respective structural elements of the mobile telephone 100 shown in FIGS. 1 to 6. The ten-key 10 is an operation key used for inputting a telephone number and characters of an electronic mail. The guide keys 11 to 13 are operation keys in which different functions are assigned in accordance with usage situations and the assigned function is displayed in the main display 20, and generally called soft keys or function keys.

The main multifunctional key 14 is an independent single operation key in which four kinds of operation inputs can be made by upper, lower, left and right pressing portions. The main multifunctional key 14 is called a cross key due to the arrangement of the pressing portions, and also called a direction key because it is suitable for cursor movement. However, it is not exclusively used for cursor movement, and a different function can be assigned to each of the pressing portions. For example, it is possible to assign an incoming telephone call history to a left operation, redial to a right operation, a message memo to an upper operation, and a shortcut menu display to a lower operation.

The main multifunctional key 14 has a ring shape and the main guide key 12 being a different operation key is arranged in the center. Among the operation keys 10 to 17, the main functional key 14 has the highest usage frequency in general, followed by a high usage frequency of the main guide keys 11 to 13. Moreover, among the main guide keys 11 to 13, the main guide key (center guide key) 12 to be used as a determination key has the highest usage frequency. Therefore, the main guide key 12 is arranged in the center of the main multifunctional key 14 by taking operability into consideration.

The off-hook key 15 is an operation key which is operated at the time of starting the telephone call, and the off-hook 16 is an operation key which is operated at the time of finishing the telephone call. Although the main key 17 is an operation key in which different functions are assigned in accordance with usage situations, the function assignment is not displayed in the main display 20, which is different from the guide keys 11 to 13.

The sub guide keys 23 and 24 provided on the display panel of the display case 2 are operation keys corresponding to the main guide keys 11 and 13, and used in the reverse open state and the reverse close state. In these terminal states, the main display 20 is used by turning upside down, so that the sub guide keys 23 and 24 are arranged in the lower side of the main display 20 in the display state, or the opposite side of the movable connector 3 in the display panel (top end portion side of the case rather than the main display 20). In the normal open state, an operation input by the sub guide keys 23 and 24 is inactivated to prevent the erroneous operation.

The telephone call receiver 21 is a receiver used in the telephone call in the normal open state, and arranged in the opposite side of the movable connector 3 (top end portion side of the case rather than the main display 20) in the display panel. Meanwhile, the telephone call receiver 22 is the telephone call receiver used in the reverse close state, and arranged in a side of the movable connector 3 rather than the main display 20 in the display panel.

Side operation keys 25 to 27 are arranged in the end surface of the operation case 1. These side operation keys 25 to 27 are arranged in the left side surface of the operation case 1, and in a side of the movable connector 3 rather than the center of the operation case 1 in the longitudinal direction. These side operation keys 25 to 27 are used in the reverse open state and the reverse close state, and an operation input thereof is inactivated in the normal open state to prevent a key operation which is not intended by the user.

The side operation key 25 is a side guide key (so called determination key) to be made to correspond to the main guide key 12, and capable of performing the same operation input with the main guide key 12. The side operation key 27 is a side clear key to be made to correspond to the main clear key 17, and capable of performing the same operation input with the main clear key 17.

The side operation key 26 is a side multifunctional key to be made to correspond to the main multifunctional key 14. The side multifunctional key 26 is an independent single operation key in which four kinds of operation inputs can be made by upper, lower, left and right pressing portions. If the user performs the same operations with the main multifunctional key 14 in the side multifunctional key 26, the same operation inputs can be made.

In relation to the main guide key 12 arranged in the center of the main multifunctional key 14, the side guide key 25 is arranged in the vicinity of the side multifunctional key 26. Because the side multifunctional key 26 is arranged in the end surface of the operation case 1, the side guide key 25 is separated from the side multifunctional key 26 and arranged in the vicinity thereof, so that the operation case 1 can be thinned while suppressing costs without significantly reducing operability.

A camera 52 and the mobile light 53 are provided in the main surface to be different from the operation panel in the operation case 1. The camera 52 is an imaging means comprised of a CCD or CMOS image sensor, in which an object image is subjected to a monitor display in the main display 20 as a finder at the time of taking a shot. Accordingly, it is used in the normal open state or the reverse close in the case of taking a shot of another person and a scene or the like, and used in the reverse open state in the case of taking a shot of the user by himself. The mobile light 53 is a flash light which is turned on at the time of lacking exposure and comprised of an LED.

Either of the magneto 40 or the magnetic sensor 41 is provided in the operation case 1, while the remaining is provided in the display case 2, and they are arranged in mutually opposing positions in the normal close state. Therefore, if the magnetic sensor 41 detects a line of magnetic force of the magneto 40, the normal close state can be determined.

Either of the magneto 42 or the magnetic sensor 43 is arranged on the rotating member 32 of the moveable connector 3, while the remaining is arranged on the flame member 33 of the display case 2. They are arranged in mutually opposing positions in the state of being offset to the second rotating axis A2, and directing the operation panel and the display panel in the same direction. Therefore, if the magnetic sensor 43 detects a line of magnetic force of the magneto 42, it is possible to determine the normal open state and the normal close state, while the reverse open state and the reverse close state can be determined if there is no detection. A hall element and an MR element or the like can be used in the magnetic sensors 41 and 43.

FIG. 7 is a functional block diagram showing an example of the internal electrical configuration of the mobile telephone 100 of FIG. 1. A main control unit 60 is comprised of a processor which executes a main control of the mobile telephone 100. A wireless unit 61 is a wireless unit to perform a wireless communication with a cellular wireless base station (not shown) via an antenna. A communication control unit 62 controls the wireless communication on the basis of an instruction of the main control unit 60.

A terminal state detector 63 determines the terminal state on the basis of a detected signal of the magnetic sensors 41 and 43. If the detected result of the magnetic sensors 41 and 43 is used, it is possible to determine the normal close state, the normal open state and the remaining states (specifically the reverse open state and the reverse close state). However, it is impossible to determine the difference between the reverse open state and the reverse close state. The main control unit 60 differentiates operations in an input control unit 64, a voice control unit 65, and a display control unit 66 on the basis of the determined result. In the present embodiment, the difference between an operation in the reverse open state or the reverse close state and an operation in the normal open state will be mainly explained.

The input control unit 64 monitors operations in the main operation keys 10 to 17, the sub guide keys 23 and 24, and the side operation keys 25 to 27, and output a key operation signal to the main control unit 60. At that time, operations in the sub guide keys 23 and 24, and the side operation keys 25 to 27 are inactivated on the basis of the terminals state.

It is impossible to use the main operation keys 10 to 17 in the normal close state and the reverse close state of being folded with the operation panel turned inside. In the reverse open state in which the display panel and the operation panel are directed to the opposite directions, it is impossible to operate the main operation keys 10 to 17 while browsing the main display 20, so that operability is extremely bad. Therefore, in the normal close state, the reverse close state and the reverse open state, the sub guide keys 23 and 24, or the side operation keys 25 to 27 are used in place of the main operation keys 10 to 17.

The sub guide keys 23 and 24, and the side operation keys 25 to 27 are made to correspond to the main operation keys 11 to 14 and 17, in which the same operations with the main operation keys are performed to achieve the same operation inputs therewith. That is, the same functions with the corresponding keys in the operation panel are assigned. Also, if different functions are assigned to the main operation keys 11 to 14 and 17 in response to the period of operational time, or if functions are different depending on a short keypress and a long keypress, the same functions with the corresponding main operation keys for the short keypress and the long keypress are assigned to the sub guide keys 23 and 24, and the side operation keys 25 to 27.

However, the sub guide keys 23 and 24, and the side operation keys 25 to 27 are possibly operated in the normal open state without any intentions of the user, so that these key operations are inactivated in the normal open state by the input control unit 64. Particularly when the phone call is made in the normal open state, there is a high possibility of the erroneous operation made by the side operation keys 25 to 27 and the effect of the erroneous operation is large during the telephone call, thereby an operation input by the side operation keys 25 to 27 should be desirably inactivated at least during the telephone call in the normal open state.

The voice control unit 65 executes an input/output control of a voice signal, in which receiving voice is outputted to the telephone call receivers 21 and 22, and transmitting voice is inputted from the telephone call microphone 18. The telephone call receiver 21 is used in the case of the telephone call in the normal open state, while the telephone call receiver 22 is used in the case of the telephone call in the reverse close state. The telephone call microphone 18 is commonly used in the both terminal states.

The display control unit 66 executes a display control of the main display 20 and the sub display 51. It also rotates a display image of the main display 20 by 180 degrees on the basis of the terminal state. If transition is made between the normal open state and the reverse close state, the main display screen is rotated by 180 degrees and the vertical direction is inverted to be seen from the user to hold the operation case 1 without changing the way of holding. Therefore, in the reverse close state and the reverse open state, a display image in the normal open state is rotated by 180 degrees to display in the main display 20.

The display control unit 66 displays a function assignment to each of the guide keys in the lower end of the main display 20. That is, in the normal open state, positions of the main guide keys 11 to 13 are made to be consistent with display positions of assigned functions in the main display 20. Meanwhile, in the reverse open state and the reverse close state in which the sub guide keys 23 and 24 are used, positions of the sub guide keys 23 and 24 are made to be consistent with display positions of assigned functions in the main display 20 by rotating a display image by 180 degrees.

Explained next will be a usage example of the mobile telephone 100 according to this embodiment using FIGS. 8 to 14.

FIG. 8 is a diagram showing the state on standby in the normal open state. Also, FIG. 9 is a diagram showing the state on standby in the reverse close state. Because a display image in the main display 20 is rotated by 180 degrees in accordance with the terminal states, the same image display is exhibited in the respective terminal states to be seen from the user. Moreover, as shown in the following chart, the same functions are assigned to the usable operation key in the respective terminal states.

TABLE 1

Function assignment in standby

| Normal open state | Reverse open state | Function assignment |
|---|---|---|
| Main guide keys 11 | Sub guide key 23 | Mail |
| Main guide keys 12 | Sub guide key 25 | Decision |
| Main guide keys 13 | Sub guide key 24 | Camera |
| Main multifunctional key 14 | Side multifunctional key 26 | |
| Left operation | Left operation | Incoming history |
| Right operation | Right operation | Redial |
| Upper operation | Upper operation | Message memo |
| Lower operation | Lower operation | Shortcut |

If a standby screen is displayed on the main display 20, mail, determination and camera functions are assigned to the main guide keys 11 to 13 respectively in the normal open state. Also, with respect to the left, right, upper and lower operations of the main multifunctional key 14, incoming telephone call history, redial, message memo, and shortcut functions are assigned respectively.

Meanwhile, in the reverse close state, mail, determination and camera functions are assigned to the sub guide key 23, the side guide key 25, and the sub guide key 24 respectively. Also, with respect to the left, right, upper and lower functions of the side multifunctional key 26, incoming telephone call history, redial, message memo, and shortcut functions are assigned respectively. This applies to the reverse open state while displaying the standby screen in exactly the same manner.

That is, operations to be made using the main guide keys 11 to 13 and the main multifunctional key 14 in the normal open state can be performed in the reverse open state and the reverse close state using the sub guide keys 23 and 24, the side guide key 25, and the side multifunctional key 26.

FIG. 10 is a diagram showing the state during an incoming telephone call in the normal open state in comparison with the reverse close state, in which FIG. 10a shows the state during an incoming telephone call in the normal open state, and FIG. 10b shows the state during an incoming telephone call in the reverse close state.

During the incoming telephone call, in the normal open state call, a menu display function is assigned to the main guide key 12. In the reverse open state and the reverse close state, the menu display function is assigned to the side guide key 25, while on-hook and off-hook functions are assigned to the sub guide keys 23 and 24 respectively.

In the reverse close state, it is impossible to use the off-hook key 15 and the on-hook key 16 in the operation panel. Therefore, the on-hook and off-hook functions that are not assigned to main guide keys 11 to 13 in the normal open state are assigned to the sub guide keys 23 and 24 respectively during an incoming telephone call in the reverse close state. Accordingly, if there is an incoming telephone call in the reverse close state, the user can start to make the telephone call by performing the on-hook operation in the reverse close state without any changes.

FIG. 11 is a diagram showing the state during the telephone call in the normal open state in comparison with the reverse close state, in which FIG. 11*a* shows the state during the telephone call in the normal open state, and FIG. 11*b* shows the state during the telephone call in the reverse close state.

If it is during the telephone call in the normal open state, the menu display function is assigned to the main guide key 12 in the same manner with the state during an incoming telephone call. If it is during the telephone call in the reverse open state and the reverse close state, the menu display function is assigned to the side guide key 25, while speaker receiving and on-hook functions are assigned to the sub guide keys 23 and 24 respectively.

The speaker receiving is a function to output receiving voice from a speaker not shown, and it is the function assigned to the off-hook key 15 during the telephone call in the normal open state and the function assigned to the sub guide key 23 during the telephone call in the reverse close state. Meanwhile, the on-hook function is assigned to the sub guide key 24 during a call in the reverse close state. Therefore, the user can perform the on-hook operation in the reverse close state without any changes in order to finish the telephone call. That is, functions of the off-hook key 15 and the on-hook key 16 can be used in the reverse close state both during the telephone call and during an incoming telephone call.

Although it is possible to use the side guide keys 25 to 27, and the sub guide keys 23 and 24 in the reverse close state, a face is approached to the mobile telephone during the telephone call, so that the side guide keys 25 to 27 are exclusively operated. Therefore, from the aspect of preventing the erroneous operation, the on-hook function should be desirably applied to the sub guide key 23 or 24 instead of applying to the side operation keys 25 to 27.

FIG. 12 is a diagram showing the state of inputting a telephone number in the normal open state in comparison with the reverse close state, in which FIG. 12*a* shows the state of inputting a telephone number in the normal open state, and FIG. 12*b* shows the state of inputting telephone number in the reverse close state.

When a telephone number is inputted, calculator, telephone book, sub menu functions are assigned to the main guide keys 11 to 13 respectively in the normal open state. In the reverse close state and the reverse open state, telephone book and sub menu functions are assigned to the side guide key 25 and the sub guide key 24 respectively, while an on-hook function is assigned to sub guide key 23.

It is impossible to use the ten-key 10 in the reverse close state. However, the telephone book can be used. It is also possible to make transition to the reverse close state after inputting a telephone number in the normal open state, so that the telephone call can be made. Therefore, the off-hook function which is different from the functions assigned to the main guide key 11 is assigned to the sub guide key 23, so that the user can make the telephone call by performing the off-hook operation in the reverse close state without any changes.

FIG. 13 is a diagram showing the state of a camera shot in the normal open state. Also, FIG. 14 is a diagram showing the state of a camera shot in the reverse open state. The same functions are assigned to the usable operation keys in the respective terminal states at the time of a camera shot as shown in the following chart, in the same manner with the standby state shown in FIG. 8 and FIG. 9.

TABLE 2

| Function assignment in standby | | |
|---|---|---|
| Normal open state | Reverse open state | Function assignment |
| Main guide keys 11 | Sub guide key 23 | Light ON/OFF |
| Main guide keys 12 | Sub guide key 25 | Camera shot |
| Main guide keys 13 | Sub guide key 24 | Sub menu |
| Main multifunctional key 14 | Side multifunctional key 26 | |
| Left operation | Left operation | Zoom down |
| Right operation | Right operation | Zoom up |
| Upper operation | Upper operation | Brightness adjustment (increase) |
| Lower operation | Lower operation | Brightness adjustment (decrease) |

At the time of a camera shot in the normal open state, light on/off, camera shot and sub menu functions are assigned to the main guide keys 11 to 13 respectively. With respect to the left, right, upper and lower operations of the main multifunction keys 14, camera shot adjustment functions such as zoom down, zoom up, brightness increase, and brightness decrease are assigned respectively.

Meanwhile, at the time of a camera shot in the reverse open state, light-on/off, camera shot and sub menu functions are assigned to the sub guide key 23, the sub guide key 25, and the sub guide key 24 respectively. Also, with respect to the left, right, upper and lower operations of the sub multifunction key 26, camera shot adjustment functions such as zoom-down, zoom-up, brightness increase and brightness decrease are assigned respectively. This applies to a camera shot in the reverse close state in exactly the same manner.

That is, the operation keys 11 to 14 and 23 to 26 are used as a shot control key to perform various kinds of setting and a release operation related to a camera shot, in which the user can operate the shot control key in either states of the normal open state, the reverse close state and the reverse open state. In addition, an operation input made by using the main guide keys 11 to 13 and the main multifunction key 14 in the normal open state can also be performed by using the sub guide keys 23 and 24 and the side operation keys 25 and 26 in the reverse open state and the reverse close state.

Although explanation was made for examples of the functions assigned to the short keypress of the respective operation keys in FIGS. 8 to 14, functions assigned to the long keypress of these operation keys are exactly the same, thereby duplicated explanation will be omitted.

FIG. 15 is a flowchart showing an example of an input control related to the side operation keys 25 to 27 in the mobile telephone 100 of FIG. 1 as steps S101 to S108. The mobile telephone 100 according to this embodiment has a side key inactivation flag (not shown) to inactivate an operation input by the side operation keys 25 to 27. The side key inactivation flag is renewed by the terminal state detector 63 on the basis of the detected signal of the magnetic sensors 41 and 43. The input control unit 64 controls an operation inputs by the side operation keys 25 to 27 on the basis of the side key inactivation flag.

The terminal state is initially determined by the terminal state detector 63 (step S101). At this time, if the terminal is in the normal open state, the side key inactivation flag is turned on (steps S102 and S103). If the side key inactivation flag is in the on state, the input control unit 64 does not output a key operation signal of the side operation keys 25 to 27 to the main control unit 60, so that an operation input by the side operation keys 25 to 27 is inactivated (step S104). Accordingly, it is possible to prevent the erroneous operation of the side operation keys 25 to 27 in the normal open state.

If the terminal is in the reverse open state or the reverse close state, the side key inactivation flag is turned off, so that an operation input by the side operation keys 25 to 27 is activated (steps S105 to S107).

If the terminal is in the normal close state, a closing process is executed because a display or the like by the main display 20 is finished (step S108). If the side operation keys 25 to 27 are not used in the normal close state, an operation input of the side operation keys 25 to 27 can be inactivated in the normal close state by including a process to turn on the side inactivation flag in said closing process.

According to this embodiment, the side operation keys 25 to 27 are provided in the side surface of the operation case 1, and the sub guide keys 23 and 24 are provided on the display panel, so that various kinds of operation inputs can be performed while browsing the main display 20 in the reverse close state in which the mobile telephone is folded to be compact. At that time, the same operations with the main guide keys 11 to 13 and the main multifunction key 14 are performed to achieve the same operation inputs therewith, resulting in good operability and easy understanding of the operations for the user. Also, an operation input by the side operation keys 25 to 27 is inactivated in accordance with the terminal states, enabling to prevent the erroneous operation performed against intentions of the user.

The structure and the operation to movably connect the mobile telephone explained in this embodiment are an example, and the present invention is not limited the cases stated above. That is, the present invention can be applied to a foldable mobile telephone which is comprised of the operation case 1 and the display case 2, and has at least the normal open state of being expanded by directing the display panel and the operation panel to the same direction, and the reverse close state of being folded by directing the operation panel inward and the display panel outward.

Second Embodiment

In the first embodiment, explanation was made for the example in the case of controlling activation and inactivation of an operation input by the side operation keys 25 to 27. In this embodiment, the case of controlling activation and inactivation of an operation input by the main operation keys 10 to 17 and the sub guide keys 23 and 24 will be further explained.

FIG. 16 is a flowchart showing an example of an input control according to the second embodiment of the present invention as steps S201 to S210, exhibiting an example of the input control related to the main operation keys 10 to 17, the sub guide keys 23 and 24, and the side operation keys 25 to 27 in the mobile telephone 100 of FIG. 1. The terminal state is initially determined by the terminal state detector 63 (step S201).

At this time, if it is in the normal open state, an operation input by the side operation keys 25 to 27 and the sub guide keys 23 and 24 is inactivated, so that an operation input by the main operation keys 10 to 17 is activated (steps S202 to S205). That is, the input control unit 64 does not output a key operation signal of the side operation keys 25 to 27 and the sub guide keys 23 and 24 to the main control unit 60 on the basis of the detected result of the terminal states. Therefore, it is possible to prevent an erroneous input by the side operation keys 25 to 27 and the sub guide keys 23 and 24 in the normal open state.

Meanwhile, if it is in the reverse open state or the reverse close state, an operation input by the side operation keys 25 to 27 and the sub guide keys 23 and 24 is activated, and an operation input by the main operation keys 10 to 17 is inactivated (steps S206 to S209). That is, the input control unit 64 does not output a key operation signal of the main operation keys 10 to 17 to the main control unit 60 on the basis of the detected result of the terminal state. Therefore, it is possible to prevent an erroneous input by the main operation keys 10 to 17 in the reverse open state or the reverse close state.

The reverse open state is a terminal state in which the both cases are folded with the operation panel directed inward, so that the user does not operate the main operation keys 10 to 17 in this terminal state. However, due to dust or the like held between the operation case 1 and the display case 2, the main operation keys 10 to 17 are occasionally operated, so that such the erroneous operation can be prevented by inactivating the main operation keys 10 to 17 in the reverse close state.

If the terminal is in the normal close state, a closing process is executed to finish a display or the like by the main display 20 (step S210). The closing process may include a process to inactivate an operation input by the main operation keys 10 to 17 and the sub guide keys 23 and 24. It is also possible to further include a process of inactivate an operation input by the side operation keys 25 to 27.

According to this embodiment, the terminal state detector 63 detects the terminal state, so that the input control unit 64 controls the main operation keys 10 to 17, the sub guide keys 23 and 24, and the side operation keys 25 to 27 on the basis of the detected result. Therefore, it is possible to switch and control activation and inactivation of these operation keys in accordance with terminal states, particularly the normal open state and the reverse close state, so that enhancement of operability and prevention of erroneous operations can be realized.

Third Embodiment

In the first and second embodiments, explanation was made for the examples of the mobile telephone provided with the multifunctional key in the side surface of the operation case. On the contrary, in this embodiment, an example of a mobile telephone provided with the multifunctional key on the display panel will be explained.

FIGS. 17 to 20 are diagrams showing an example of a mobile telephone according to a third embodiment of the present invention, in which appearances of a foldable mobile telephone 200 are exhibited in the normal open state, the normal close state, the reverse open state and the reverse close state.

The mobile telephone 200 according to this embodiment is also comprised of the operation case 1, the display case 2 and the movable connector 3 in the same manner with the first and second embodiments, in which the both cases 1 and 2 can be relatively rotated using the first rotating axis A1 and the second rotating axis A2 as a center. Accordingly, transition can be made into the four terminal states of the normal open state, the normal close state, the reverse open state, and the reverse close state.

The operation case 1 has the same operation panel with the case of FIG. 1 (first embodiment), but does not include the side operation key in the side surface of the operation case 1. Meanwhile, there are the main display 20 and the telephone call receivers 21 and 22, in addition to a sub camera 9, sub guide keys 71 to 73, a sub multifunction key 74 and a sub clear key 77 to be provided on the display panel of the display case 2.

The sub guide keys 71 to 73, the sub multifunction key 74 and the sub clear key 77 are an operation key (sub operation key) provided on the display panel of the display case 2. These sub operation keys 71 to 74 and 77 are made to correspond to the main guide keys 11 to 13, the main multifunction key 14 and the main clear key 17 provided on the operation panel of the operation case 1, and mainly used in the reverse close state and the reverse open state.

Each of the sub guide keys 71 to 73 is a guide key provided on the display panel, and made to correspond to the main guide keys 11 to 13 respectively. That is, if the user operates the sub guide keys 71 to 73, the same operation inputs at the time of operating the main guide keys 11 to 13 can be achieved. For example, the sub guide key 72 can be used as a determination key (main guide key 12).

The sub multifunction key 74 is a multifunction key provided on the display panel, comprised of an independent single operation key in which four kinds of operation inputs can be performed depending on upper, lower, left and right pressing portions, and made to correspond to the main multifunction key 14. That is, if the user performs the same operations with the main multifunction key 14 in the sub multifunction key 74, the same operation inputs therewith can be achieved.

The sub clear key 77 is a clear key provided on the display panel, and made to correspond to the main clear key 17. That is, if the user operates the sub clear key 77, the same operation inputs with the main clear key 17 can be achieved.

These sub operation keys 71 to 74 and 77 are used in the reverse close state and the reverse open state. In these terminal states, the main display 20 is used upside down in comparison with the normal open state, so that the sub guide keys 71 to 73, the sub multifunction key 74 and the sub clear key 77 are arranged in the lower side of the main display 20 in the display state, or more specifically in the opposite side of the movable connector 3 in the display panel.

An operation input by the sub operation keys 71 to 74 and 77 is inactivated in the normal open state in order to prevent an operation input to be made without any intentions of the user. Particularly when the telephone call is made, an erroneous input caused by the user's ear or the like abutting to the sub operation keys 71 to 74 and 77 is prevented.

As opposed to the arrangement of the main guide key 12 in the center of the main multifunction key 14, the sub guide key 72 is arranged in the vicinity of the multi function key 74. Due to this structure, the sub multifunction key 74 is miniaturized to suppress enlargement of the display panel. The sub guide key 72 may be arranged in the center of the sub multifunction key 74 in the same manner with the main guide key 12, which is needless to say.

The sub multifunction key 74 is arranged in the middle of the widthwise direction of the display panel. The short side of the top end side of the display case 2 (opposite side of the movable connector 3) is comprised of a gently curved convex shape, and both end portions of which are rounded. Therefore, a center portion of the display panel has the longest longitudinal direction, so that enlargement of the display panel can be suppressed by arranging the sub multifunction key 74 in the center of the display panel in the widthwise direction.

Furthermore, if the main multifunction key 14 is arranged in the center of the operation panel in the widthwise direction, the main multifunction key 14 in the normal open state and the sub multifunction key 74 in the reverse open state can be arranged in the lower side center of the main display 20 to be seen from the user, so that the user can perform substantially the same operations in the both terminal states. That is, operability can be integrated between the normal open state and the reverse open state by arranging the main multifunction key 14 and the sub multifunction key 74 in a position corresponding to the widthwise direction in the cases 1 and 2.

From the aspect as stated above, it is further desirable that the main multifunction key 14 in the normal open state and the sub multifunction key 74 in the reverse open state have substantially the consistent distance from the main display 20. Therefore, the center of the main display 20 should be desirably arranged in the connector 5 side rather than the center of the display panel in the longitudinal direction.

The sub camera 9 is comprised of a CCD or CMOS image sensor, and an imaging means which is more simplified than the main camera 52. The sub camera 9 is used as a camera for a TV telephone call in the normal open state and the reverse close state. That is, the user can take a shot of himself by the sub camera 9 to transmit the taken image to a terminal of a call partner while displaying an image data from the call partner in the main display 20 at the same time.

FIG. 21 is a diagram showing an example of the internal mechanical structure of the mobile telephone 200 of FIG. 17, exhibiting a main portion of the movable connector 5 along with the terminal state detection sensors 40 to 43. The magnetic sensor 41 and the magneto 40 are arranged here in the vicinity of the top end portions of the respective cases in the longitudinal direction and the center in the widthwise direction, or more specifically on the second rotating axis A2. Therefore, if the magnetic sensor 41 detects a line of magnetic force of the magneto 40, it is possible to determine the folded state which is the normal close state or the reverse close state.

FIG. 22 is a block diagram showing an example of the internal electrical configuration of the mobile telephone 200 of FIG. 17. The input control unit 64 monitors an operation input made by the main operation keys 10 to 17 and the sub operation keys 71 to 74 and 77, and outputs a key operation signal to output to the main control unit 60. At that time, a control to switch activation and inactivation of an operation input by the respective operation keys is executed on the basis of the identified result of the terminal state.

It is impossible to use the main operation keys 10 to 17 on the operation panel in the normal closes state and the reverse close state of being folded with the operation panel directed inward. In the reverse open side in which the display panel and the operation panel are directed to the opposite directions, it is impossible to perform an operation while browsing the main display 20, resulting in extremely bad operability. Therefore, in the reverse close state and the reverse open state, the sub operation keys 71 to 74 and 77 are used in place of the main operation keys 10 to 17.

That is, a control is executed in the normal open state to activate an operation input by the main guide keys 11 to 13, the main multifunction key 14 and the main clear key 17, and to inactivate an operation input by the sub guide keys 71 to 73, the sub multifunction key 74 and the sub clear key 77. Meanwhile, a control is executed in the reverse open state and the reverse close state to inactivate an operation input by the main guide keys 11 to 13, the main multifunction key 14 and the main clear key 17, and to activate an operation input by the sub guide keys 71 to 73, the sub multifunction key 74 and the sub clear key 77. In the normal close state, an operation input by all the operation keys is inactivated.

The sub operation keys 71 to 74 and 77 are made to correspond to the main operation keys 10 to 14 and 17, and the same operations with the main operation keys are performed to achieve the same operation inputs therewith. That is, the same functions with the corresponding keys in the operation panel are assigned. If different functions are assigned to the main operation keys 10 to 14 and 17 in response to the period of operation time, or more specifically if functions are differentiated by the short keypress and long keypress, the same functions with the corresponding operation keys for the short keypress and the long keypress are also assigned to the sub operation keys 71 to 74 and 77 respectively.

The sub operation keys 71 to 74 and 77 as stated above are possibly operated by the user without any intentions in the normal open state, thereby an operation input by these operation keys is inactivated in the normal open state. Particularly when the telephone call is made in the normal open state, there is a high possibility of an erroneous input in the sub multifunction key 74, so that an operation input by the sub multifunction key 74 should be desirably inactivated at least during the telephone call in the normal open state.

The display control unit 66 executes a display control of the main display 20 and the sub display 51. For example, a control to rotate a display image of the main display image 20 by 180 degrees is performed on the basis of the identified result of the terminal states. The display control unit 66 also displays functions assigned to the respective guide keys in the lower end of the main display 20. That is, in the normal open state in which the main guide keys 11 to 13 are used, positions of the main guide keys 11 to 13 are made to be consistent with display positions of the assigned functions in the main display 20. Meanwhile, in the reverse close state in which the sub guide keys 71 to 73 are used, positions of the sub guide keys 71 to 73 are made to be consistent with display positions of the assigned functions in the display screen.

The imaging control unit 67 executes an imaging control of the main camera 52 and the sub camera 9. That is, the sub camera 9 is used to take a shot at the time of a TV telephone in the normal open state and the reverse close state, and the main camera 52 is used to take a shot in the remaining states.

Explained next will be a usage example of the mobile telephone 200 according to this embodiment using FIGS. 23 and 24.

FIG. 23 is a diagram showing the state on standby in the normal open state. Also, FIG. 24 is a diagram showing the state on standby in the reverse close state. Because a display image in the main display 20 is rotated by 180 degrees in accordance with the terminal state, the same display image is exhibited in either of the terminal states to be seen from the user. As shown in the following chart, the same functions are assigned to the usable operation keys in the respective terminal states.

TABLE 3

Function assignment in standby

| Normal open state | Reverse open state | Function assignment |
|---|---|---|
| Main guide keys 11 | Sub guide key 71 | Mail |
| Main guide keys 12 | Sub guide key 72 | Decision |
| Main guide keys 13 | Sub guide key 73 | Camera |
| Main multifunctional key 14 | Sub multifunctional key 74 | |
| Left operation | Left operation | Incoming history |
| Right operation | Right operation | Redial |
| Upper operation | Upper operation | Message memo |
| Lower operation | Lower operation | Shortcut |
| Main clear key 17 | Sub clear key 77 | Clear |

That is, if the standby screen is displayed on the main display 20, determination, mail, camera and clear functions are assigned to the respective main guide keys 11 to 13 and the main clear key 17. Also, with respect to the left, right, upper and lower operations of the main multifunction key 14, incoming telephone call history, redial, message memo and shortcut functions are assigned.

Meanwhile, in the reverse close state, determination, mail, camera and clear functions are assigned to the sub guide keys 71 to 73 and the sub clear key 77. Also, with respect to the left, right, upper and lower operations of the sub multifunction key 74, incoming telephone call history, redial, message memo and shortcut functions are assigned in the same manner with the main multifunction key 14.

That is, operations made by using the main guide keys 11 to 13, the main multifunction key 14 and the main clear key 17 in the normal open state can also be performed by using the sub guide keys 71 to 73, the sub multifunction key 74 and the sub clear key 77 in the reverse close state. A display and function assignment in the reverse open state are the same with those of the reverse close state.

FIG. 25 is a flowchart showing an example of an input control related to the main operation keys 10 to 17, and the sub operation keys 71 to 74 and 77 in the mobile telephone 200 of FIG. 17 as steps S301 to S308. The terminal state is initially determined by the terminal state detector 63 (step S301).

At that time, if the terminal is in the normal open state, an operation input by the sub operation keys 71 to 74 and 77 are inactivated, while an operation input by the main operation keys 10 to 17 are activated (steps S302 to S304). That is, the input control unit 64 does not output a key operation signal of the sub operation keys 71 to 74 and 77 to the main control unit 60 on the basis of the detected result of the terminal state. Therefore, it is possible to prevent the erroneous operation of the sub operation keys 71 to 74 and 77 in the normal open state.

If the terminal is in the reverse open state or the reverse close state, an operation input by the sub operation keys 71 to 74 and 77 are activated, while an operation input by the main operation keys 10 to 17 are inactivated (steps S305 to S307). That is, the input control unit 64 does not output a key operation signal of the main operation keys 10 to 17 to the main control unit 60 on the basis of the detected result of the terminal state. Therefore, it is possible to prevent the erroneous operation of the main operation keys 10 to 17 in the reverse open state and the reverse close state.

If the terminal is in the normal close state, a closing process is executed to finish a display or the like by the main display 20 (step S308). The closing process includes a process to inactivate an operation input by the main operation keys 10 to 17, and the sub operation keys 71 to 74 and 77.

According to this embodiment, the sub operation keys 71 to 74 and 77 are provided on the display panel, various kinds of operation inputs can be performed while browsing the main display 20 in the reverse close state in which the mobile telephone is folded to be compact. Particularly due to the arrangement of the sub multifunction key 74 on the display panel, various kinds of operation inputs can be made possible in the reverse close state while suppressing the increase in the number of the operation keys on the display panel, reduction in the main display 20, and enlargement in the display case 2.

Also, because the sub operation keys 71 to 74 and 77 performs the same operation inputs with the main guide keys 11 to 13, the main multifunction key 14 and the main clear key 17 to achieve the same operations therewith, excellent operability and easy understanding of the operations for the user are realized.

Moreover, the terminal state detector 63 detects the terminal state, and the input control unit 64 controls to switch activation and inactivation of the main operation keys 10 to 17 and the sub operation keys 71 to 74 and 77 on the basis of the detected result. Therefore, it is possible to control activation and inactivation of the operation keys in accordance with the normal open state and the reverse close state, so that operability is enhanced and the erroneous operation can be prevented.

Particularly in the normal open state, the erroneous operation by the sub multifunction key 74 can be effectively prevented by inactivating an operation input by the sub operation keys 71 to 74 and 77. Also, an operation input by the sub multifunction key 74 is inactivated during the telephone call in the normal open state, so that the telephone call can be made without generating the erroneous operation in the normal open state.

In the reverse close state, the sub multifunction key 74 is positioned in the center in front of the main display 20 for the user, so that an operation input can be made by the multifunction key which is positioned in the center in the front side of the main display 20, in either terminal states of the normal open state and the reverse close state. Accordingly, it is made possible for the user to obtain integrated operability in the respective terminal states and to operate the multifunction keys without being interrupted to browse the main display 20 in the either of the terminal states.

Although explanation was made in this embodiment for the example in the case of controlling both activation and inactivation in an operation input by the main operation keys 10 to 17, and the sub operation keys 71 to 74 and 77, the above stated case is not limited. For example, there may be the case to control activation and inactivation exclusively for the erroneous operation by the sub multifunction operation key 74.

Fourth Embodiment

In the third embodiment, explanation was made for the example of the case in which activation and inactivation of an operation input by the operation keys can be switched in accordance with the terminal state. In this embodiment, the case of controlling illumination of the operation keys in accordance with the terminal state will be further explained.

FIG. 26 is a block diagram showing another example of the internal electrical configuration of the mobile telephone 200 of FIG. 17. In comparison with the mobile telephone of FIG. 22 (third embodiment), this mobile telephone 200' is different in the point of including a key lighting control unit 81, a main key back light 82 and a sub key back light 83.

The main key back light 82 and the sub key back light 83 are a key illumination means to illuminate the respective operation keys from the rear surface side, and comprised of an LED. The main back light 82 illuminates the respective operation keys on the operation panel including the main multifunction key 14, while the sub key back light 83 illuminates the respective operation keys on the display panel including the sub multifunction key 74.

The key lighting control unit 85 executes a lighting control of the back lights 82 and 83 respectively on the basis of the identified result of the terminal states. It is assumed that a control is executed to turn on the back light corresponding to the multifunction key in which an operation input is activated, and turn off the backlight corresponding to the multifunction key in which an operation input is inactivated. That is, a control is executed in the normal open state to turn on the light of the main guide keys 11 to 13 and the main multifunction key 14 in the normal open state, and to turn off the light of the sub guide keys 71 to 73 and the sub multifunction key 74. In the reverse close state, a control is executed to turn on the light of the sub guide keys 71 to 73 and the sub multifunction key 74, and to turn off the light of the main guide keys 11 to 13 and the main multifunction key 14.

FIG. 27 is a diagram showing an example of an operation on standby in the mobile telephone 200' of FIG. 26, in which FIG. 27*a* shows the state of key illumination in the normal open state, and FIG. 27*b* shows the state of key illumination in the reverse close state. The light of the respective operation keys on the operation panel such as the main multifunction key 14 is turned on in the normal open state, and the light of the respective operation keys on the display panel such as the sub multifunction key 74 is turned on in the reverse close state.

FIG. 28 is a flowchart showing an example of the lighting control of the back lights 82 and 83 in the mobile telephone 200' of FIG. 26 as steps S401 to S411. The terminal state is initially detected by the terminal state identification unit 63 (step S401). As a result, if it is determined that the terminal state is not changed and there is no key operation within a predetermined period of time, the key lighting control unit 81 turns off the main key back light 82 and the sub key back light 83 so as to suppress electric current consumption (steps S402 to S405).

Meanwhile, if the terminals state is changed to the normal open state, the key lighting control unit 81 turns off the sub key back light 83, and turns on the main key back light 82 (steps S406 to S408). Therefore, the user understands that the sub operation keys 71 to 74 and 77 are inactivated, and the main operation keys 10 to 17 are activated.

Also, if the terminal state is changed to the reverse open state or the reverse close state, the key lighting control unit 81 turns on the sub key back light 83, and turns off the main key back light 82 (steps S409 to S411). Therefore, the user understands that the sub operation keys 71 to 74 and 77 are activated, and the main operation keys 10 to 17 are inactivated.

Moreover, if the terminal state is changed to the normal close state, the key lighting control unit 81 turns off both the main key back light 82 and the sub key back light 83 (step S409).

According to this embodiment, the back lights 82 and 83 are turned on respectively on the basis of the identified result of the terminal state, so that key illumination can be made in the multifunction keys 14 and 74 respectively in accordance with the terminal state. Accordingly, it is possible to call user's attention by the visual effect and notify the user of activation and inactivation of the respective multifunction keys 14 and 74 in each of the terminal states. Particularly because the key back light corresponding to the multifunction keys with an activated operation input is turned on and the key back light corresponding to the multifunction keys with an inactivated operation input is turned off, the activated multifunction key can be exhibited by the key illumination for easy understanding of the user.

Fifth Embodiment

In the fourth embodiment, explanation was made for the example of the case in which the operation keys are illuminated by switching the key back lights to be turned on in accordance with the terminal state. On the contrary, in this embodiment, the case of differentiating illumination colors of the key back light in accordance with the terminal state will be explained.

FIGS. 29*a* and 29*b* are diagrams showing an example of an operation on standby in the mobile telephone 200' of FIG. 26, in which FIG. 29*a* shows the state of key illumination in the normal open state, and FIG. 29*b* shows the state of key illumination in the reverse close state. In the mobile telephone 200' according to this embodiment, a control is executed to switch illumination colors by the key back light to illuminate the respective operation keys 71 to 74 and 77 on the display panel such as the sub multifunction key 74. The switch of the illumination colors by the key back light is made on the basis of the identified result of the terminal state. For example, red color illumination is used in the normal open state, while green color illumination is used in the reverse close state.

FIG. 30 is a flowchart showing an example of the lighting control of the sub key back light 83 in the mobile telephone 200' of FIG. 26 as steps S501 to S508. The terminal state is initially determined by the terminal state identification unit 63 (step S501). As a result, if it is determined that the terminal state is not changed and there is no key operation within a predetermined period of time, the key lighting control unit 81 turns off the sub key back light 83 (steps S502 to S504).

Meanwhile, if the terminal state is changed to the normal open state, the key lighting control unit 81 turns on the sub key back light 83 with a red color (steps S505 and S506). Therefore, the user understands that the sub operation keys 71 to 74 and 77 are inactivated.

Also, if the terminal state is changed to the reverse open state or the reverse close state, the key lighting control unit 81 turns on the sub key back light 83 with a green color (steps S507 and S508). Therefore, the user understands that the sub operation keys 71 to 74 and 77 are activated.

Moreover, if the terminal state is changed to the normal close state, the key lighting control unit 81 turns off the sub back light 83 (step S507).

According to this embodiment, the key lighting control unit 81 differentiates the illumination colors of the sub key back light 83 on the basis of the terminal state. Therefore, it is possible for the user to identify whether the sub operation keys 71 to 74 and 77 are activated or inactivated by using the illumination colors of the keys.

Although explanation was made in this embodiment for the example of the case of switching the illumination colors of the operation keys in accordance with the terminal state, it does not limit the present invention. For example, the illumination colors may also be differentiated in accordance with the assigned functions. The illumination colors may also be differentiated by usage frequencies.

Also, the examples of the mobile telephones are explained in the respective embodiments stated above, but equipment to which the present invention is applied is not necessarily limited to the mobile communication terminal. That is, the present invention can be applied to various kinds of electronic instruments in which two thin cases are connected by a movable connector. For example, it is possible to be applied to an imaging device such as a digital still camera.

DESCRIPTION OF REFERENCE SYMBOLS

Figure 1:
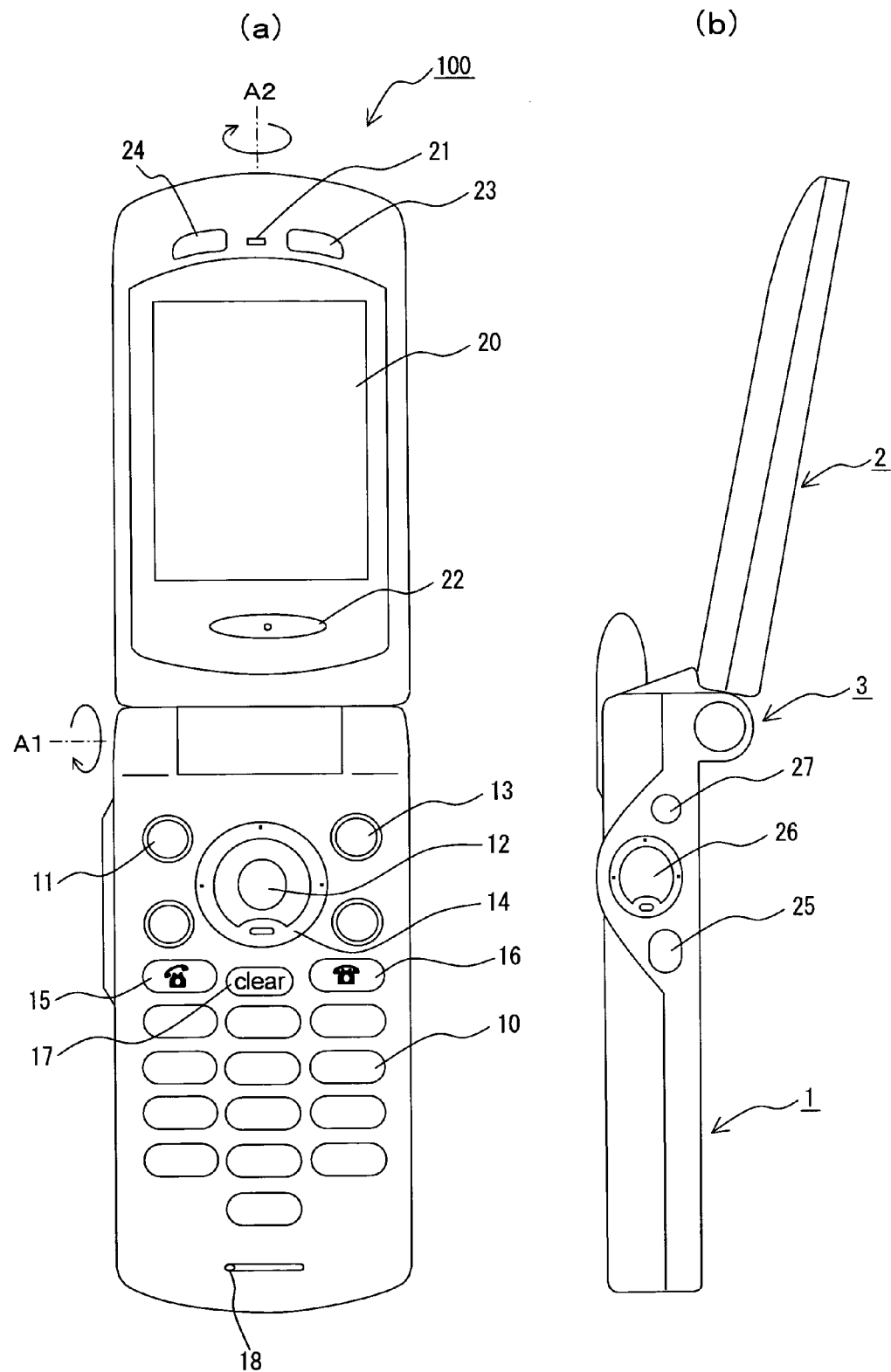
FIG. 1 is a diagram showing an example of a mobile telephone 100 according to a first embodiment of the present invention, in which appearance in a normal open state is exhibited.
Figure 2:
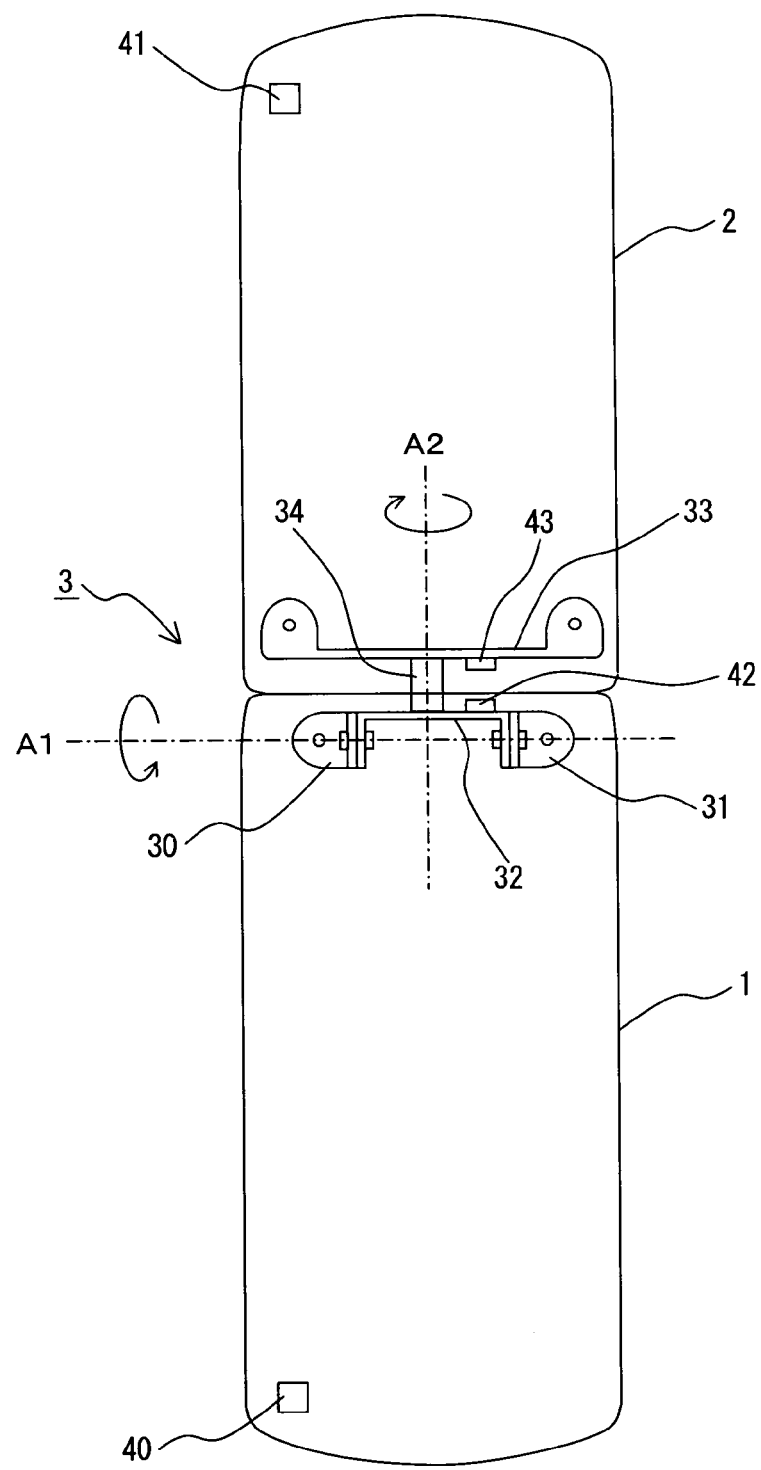
FIG. 2 is a diagram showing an example of the internal mechanical structure of the mobile telephone 100 of FIG. 1.
Figure 3:
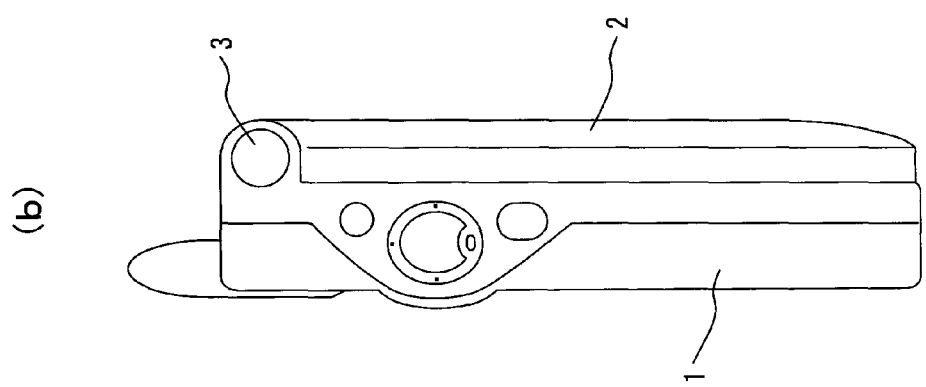
FIG. 3 is a diagram showing appearance of the mobile telephone 100 of FIG. 1 in a normal close state.
Figure 3:
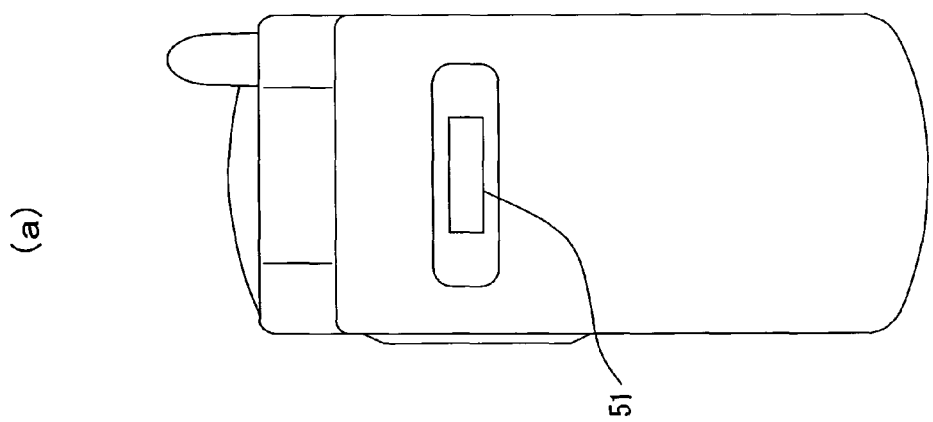
Figure 4:
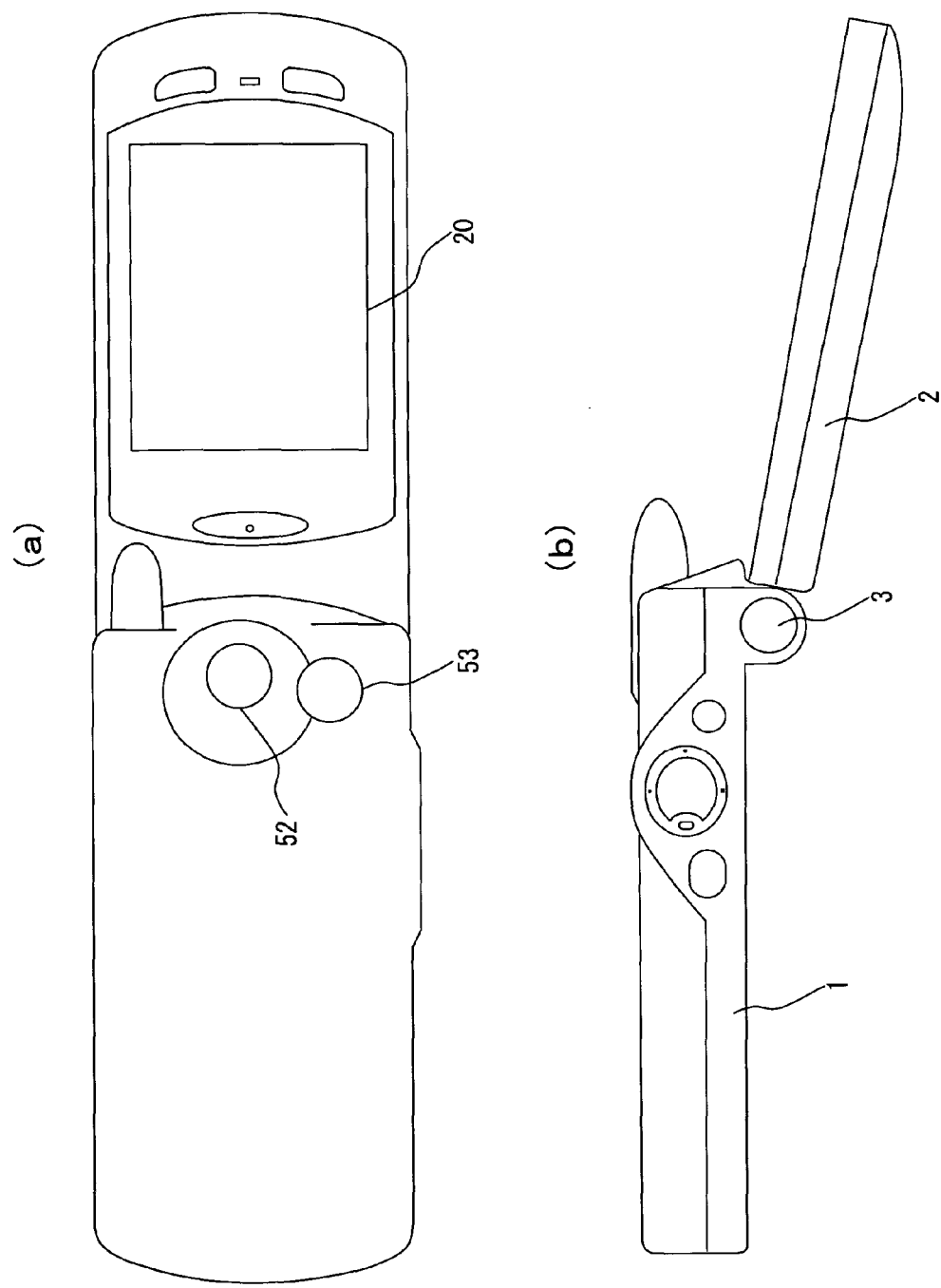
FIG. 4 is a diagram showing appearance of the mobile telephone 100 of FIG. 1 in a reverse close state.
Figure 5:
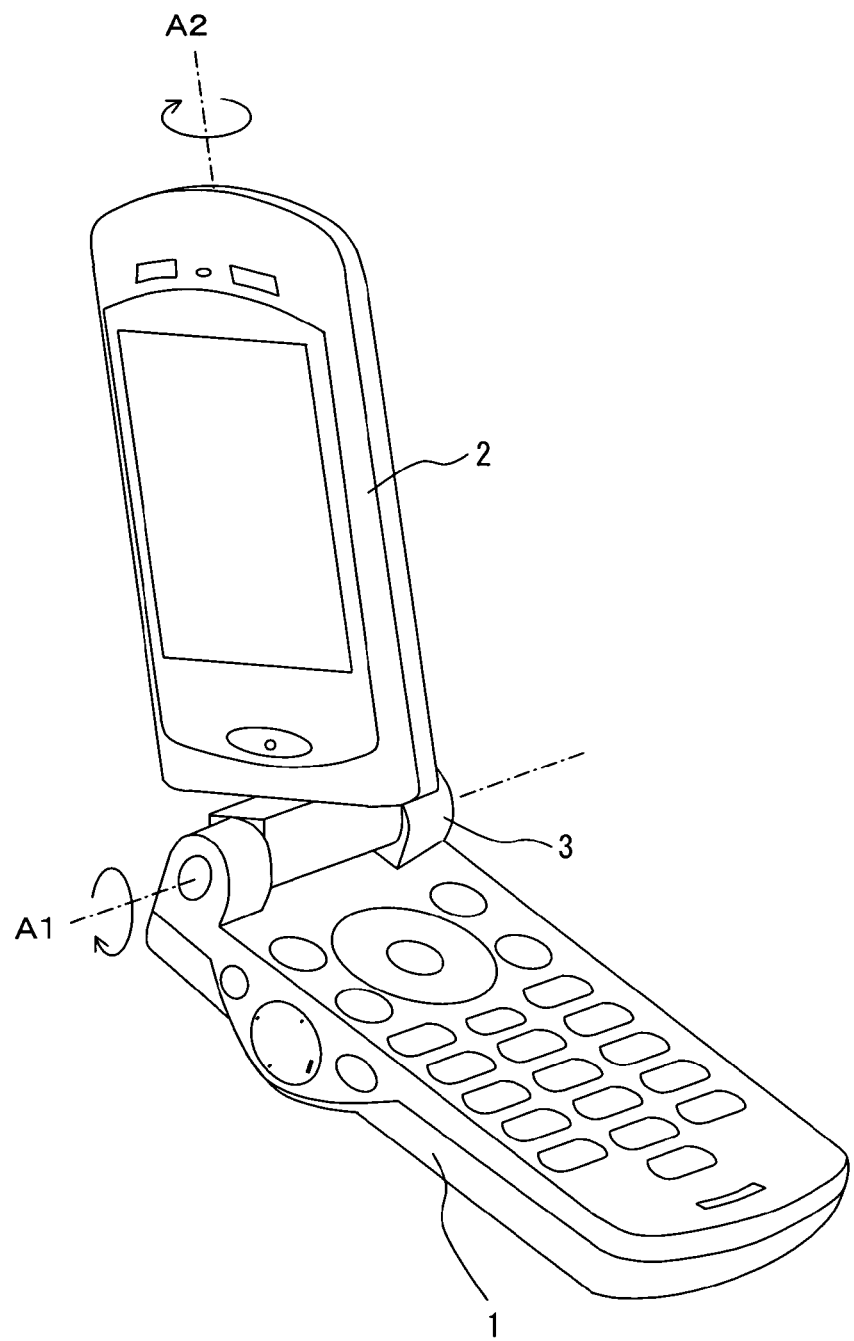
FIG. 5 is a diagram showing the state of rotating the mobile telephone 100 of FIG. 1 using a second rotating axis A2 as a center.
Figure 6:
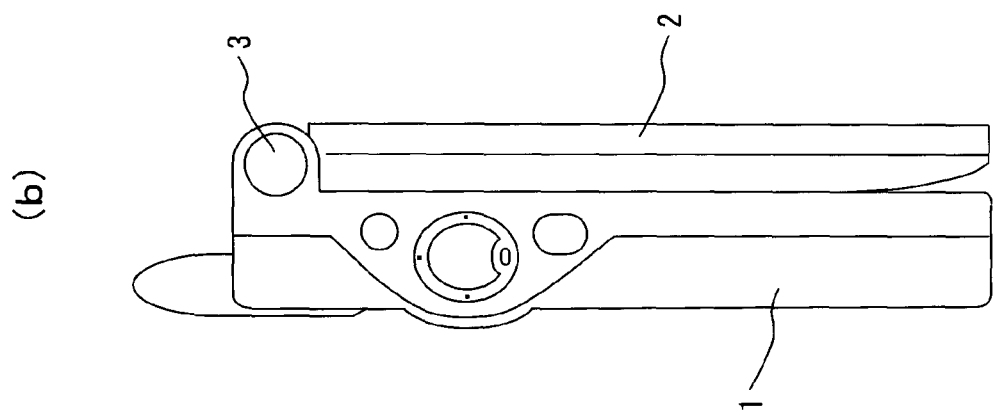
FIG. 6 is a diagram showing appearance of the mobile telephone 100 of FIG. 1 in a reverse close state.
Figure 6:
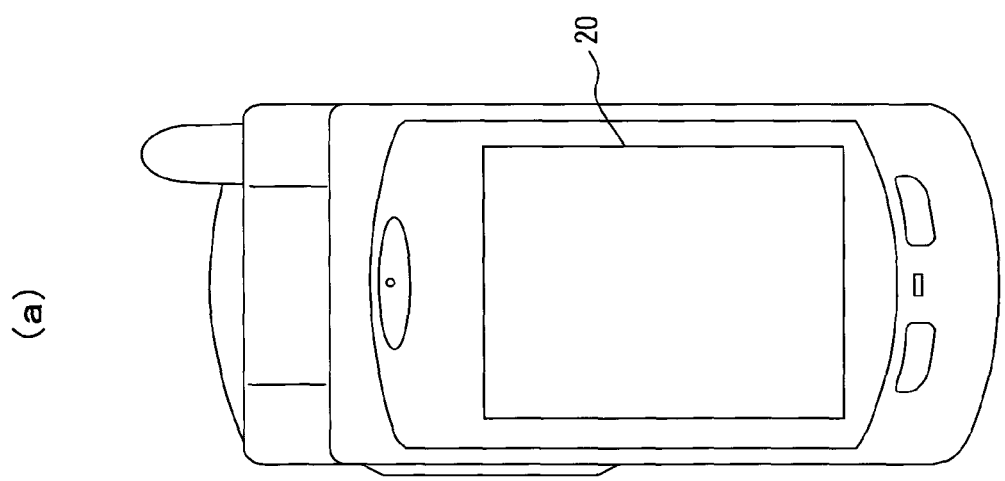
Figure 7:
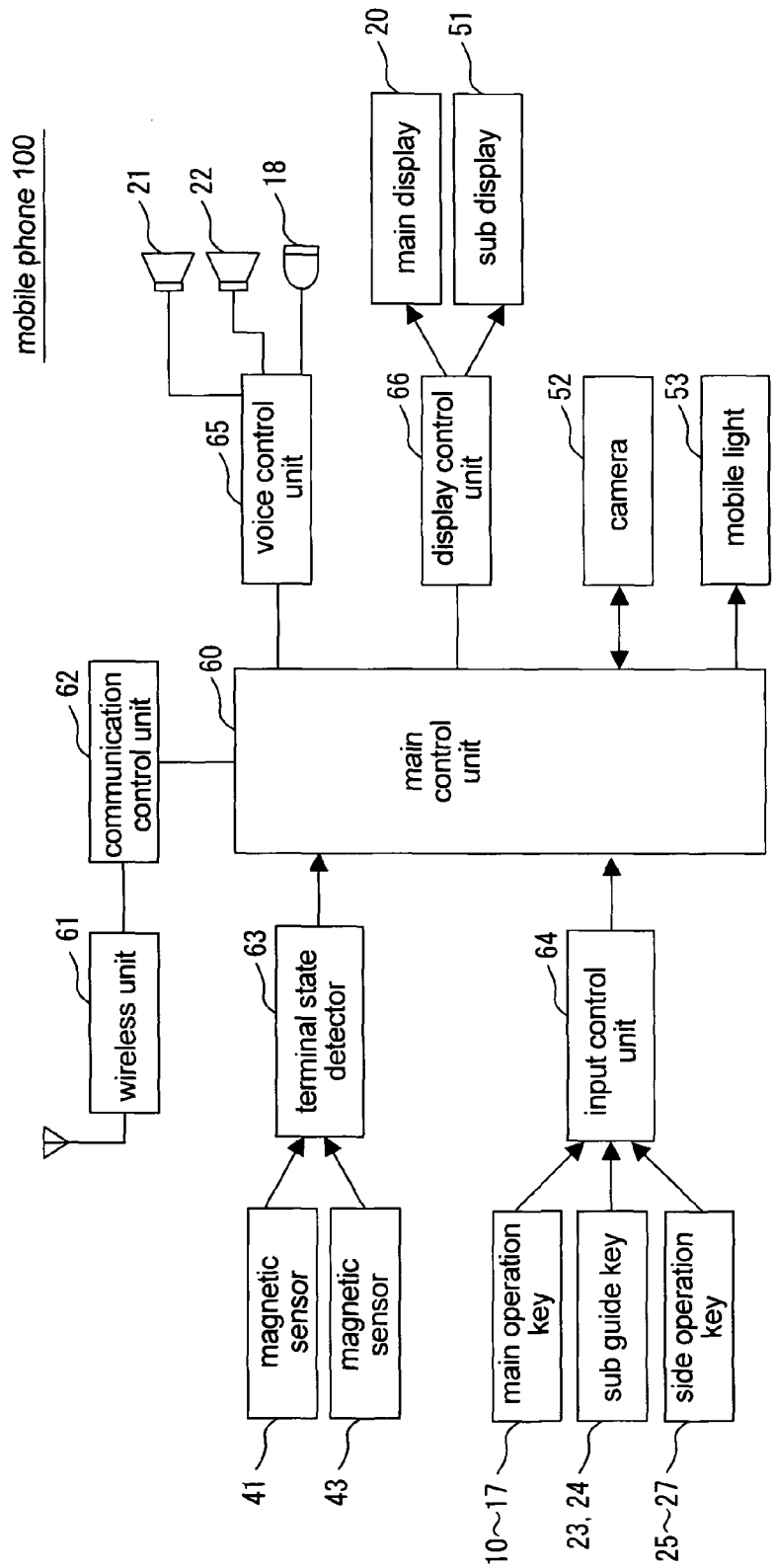
FIG. 7 is a functional block diagram showing an example of the internal electrical configuration of the mobile telephone 100 of FIG. 1.
Figure 8:
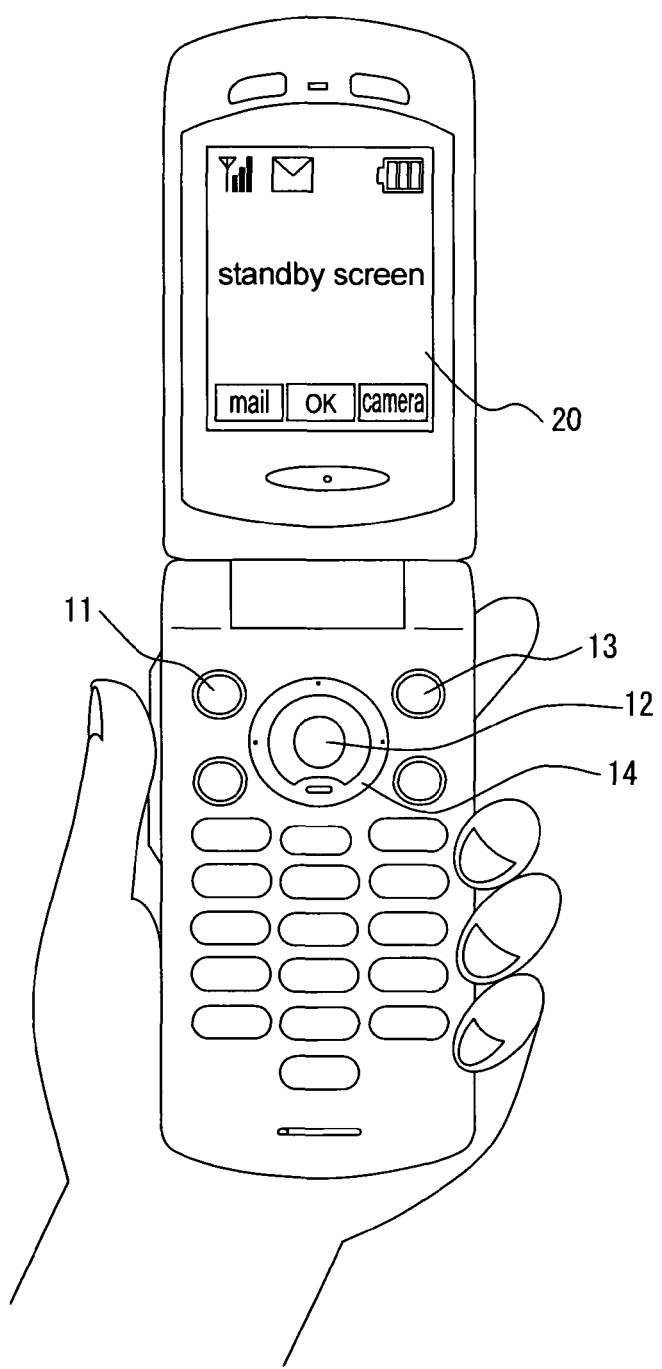
FIG. 8 is a diagram showing the state on standby in the normal open state.
Figure 9:
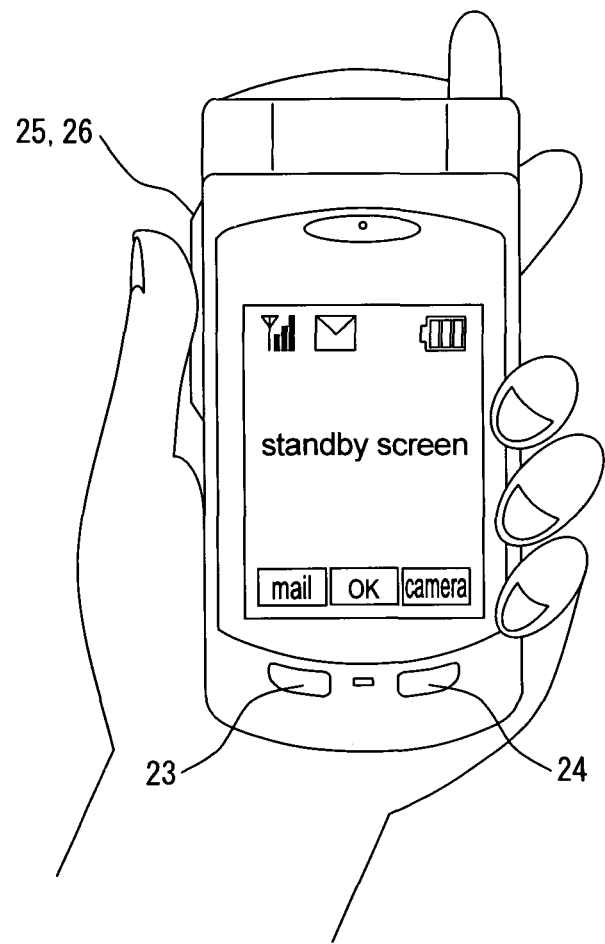
FIG. 9 is a diagram showing the state on standby in the reverse close sate.
Figure 10:
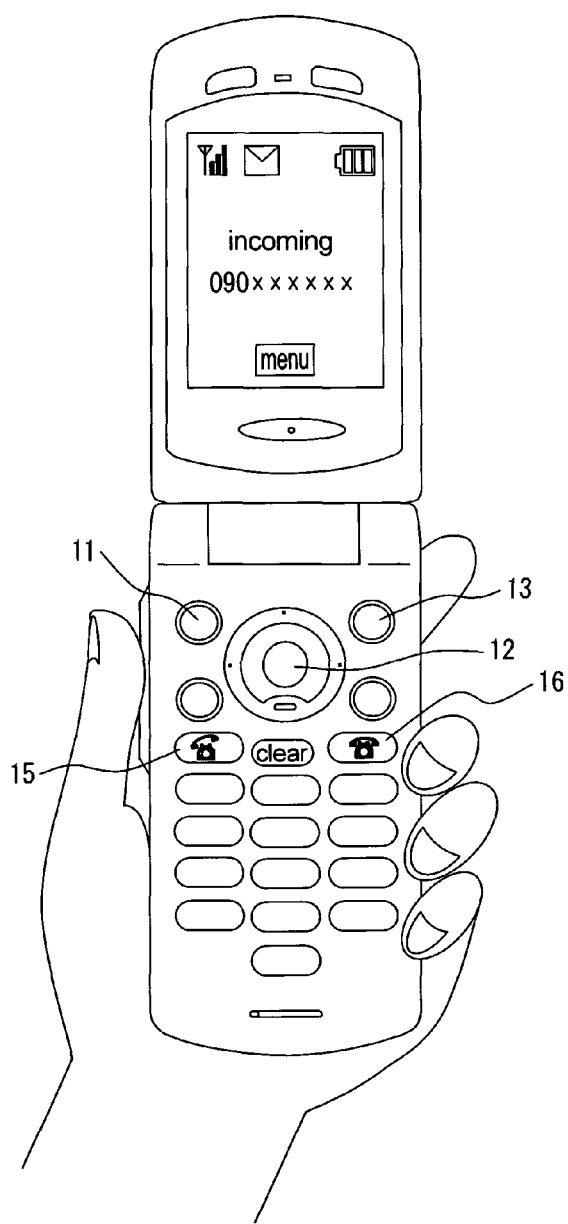
FIG. 10 is a diagram showing the state during an incoming telephone call in the normal open state in comparison with the reverse close state.
Figure 10:
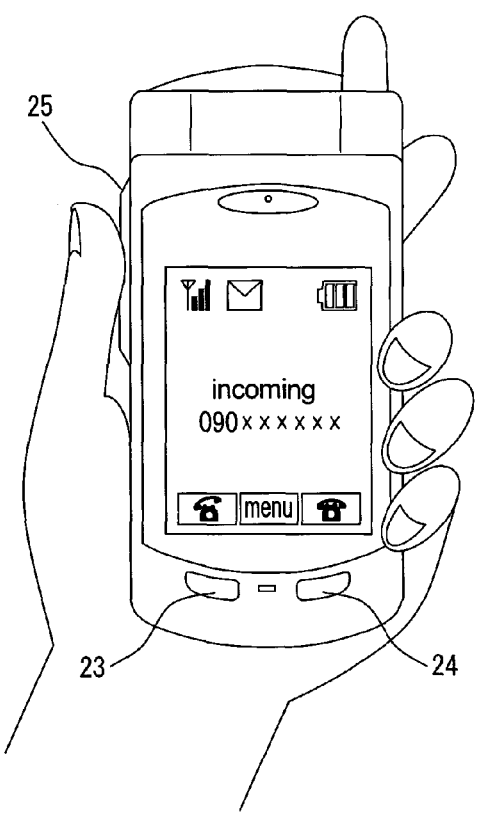
Figure 11:
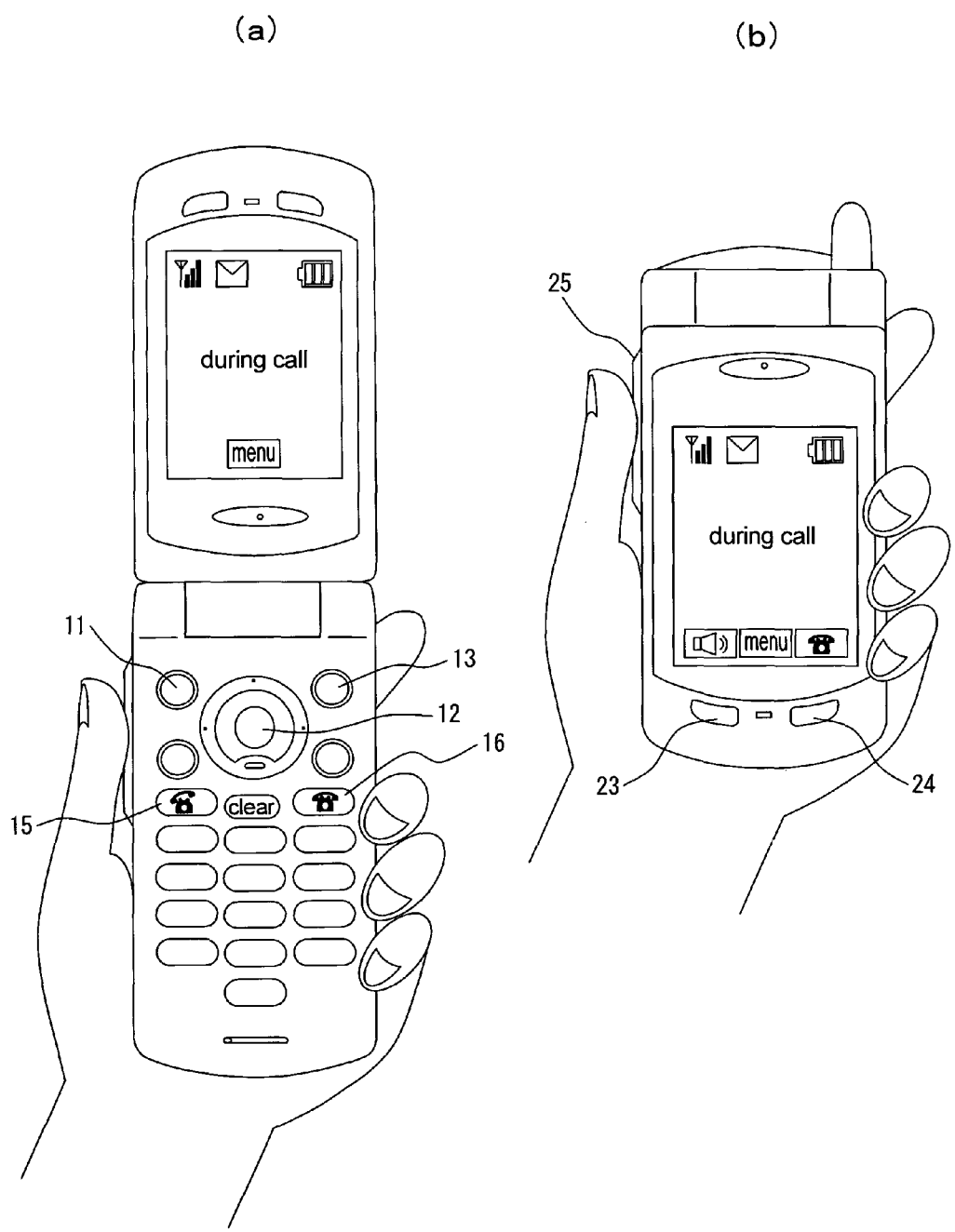
FIG. 11 is a diagram showing the state during the telephone call in the normal open state in comparison with the reverse close state.
Figure 12:
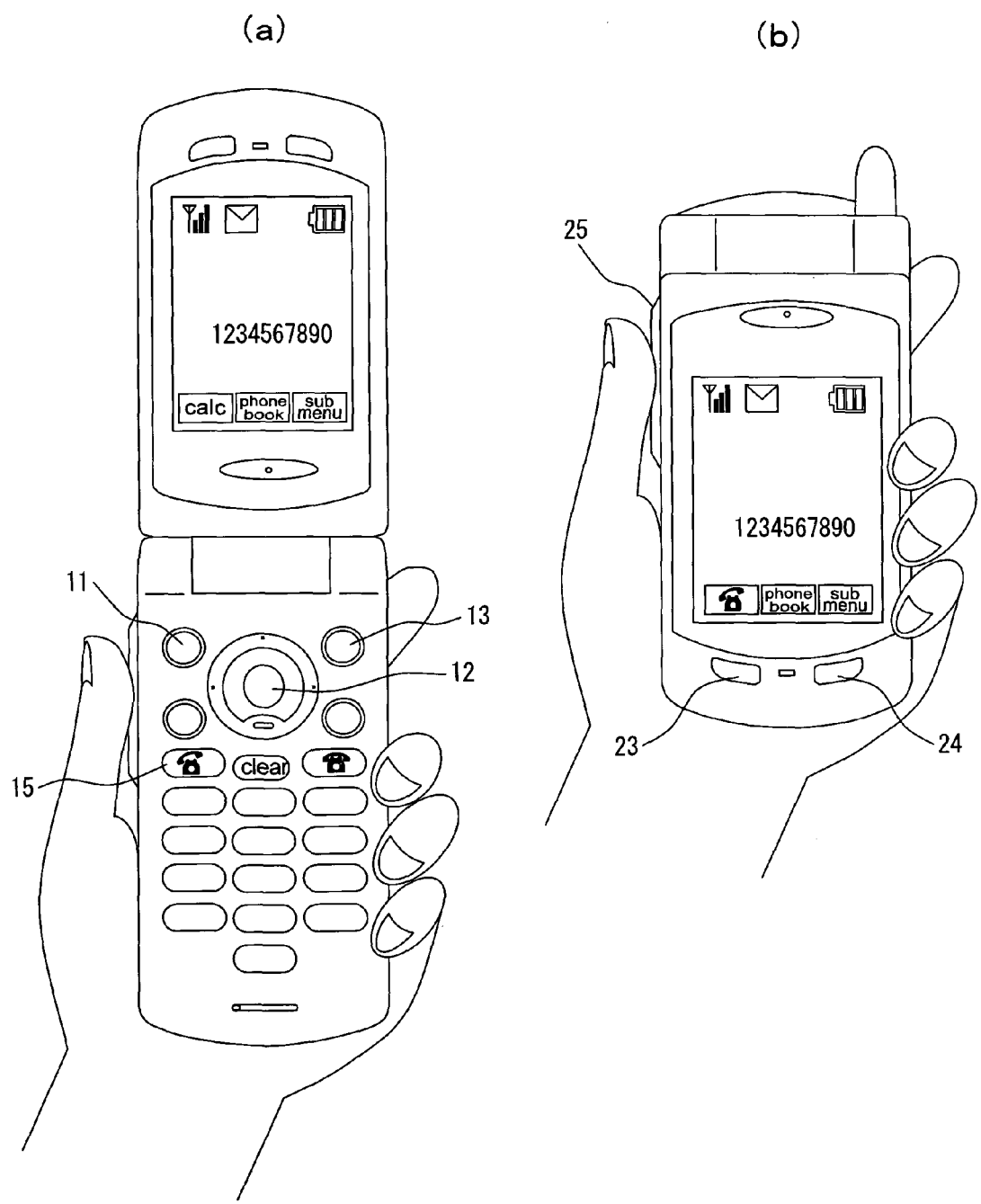
FIG. 12 is a diagram showing the state of inputting a telephone number in the normal open state in comparison with the reverse close state.
Figure 13:
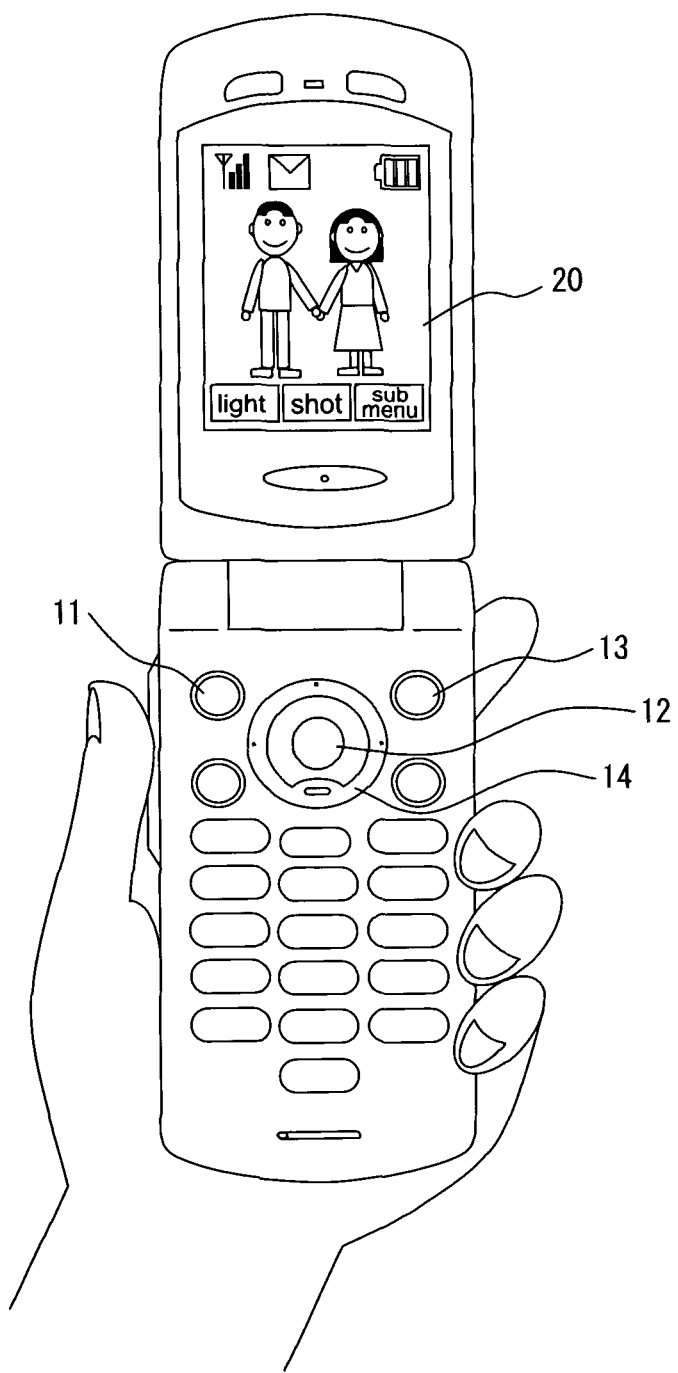
FIG. 13 is a diagram showing the state of a camera shot in the normal open state.
Figure 14:
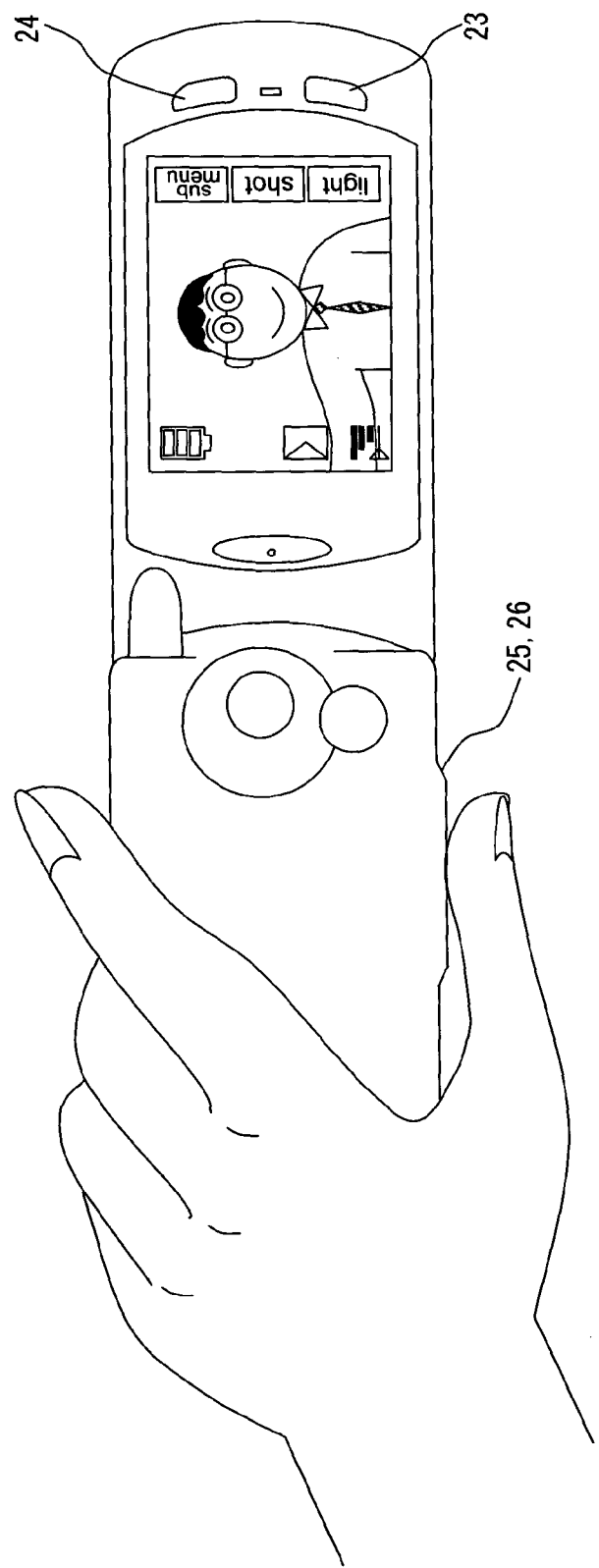
FIG. 14 is a diagram showing the state of a camera shot in the reverse open state.
Figure 15:
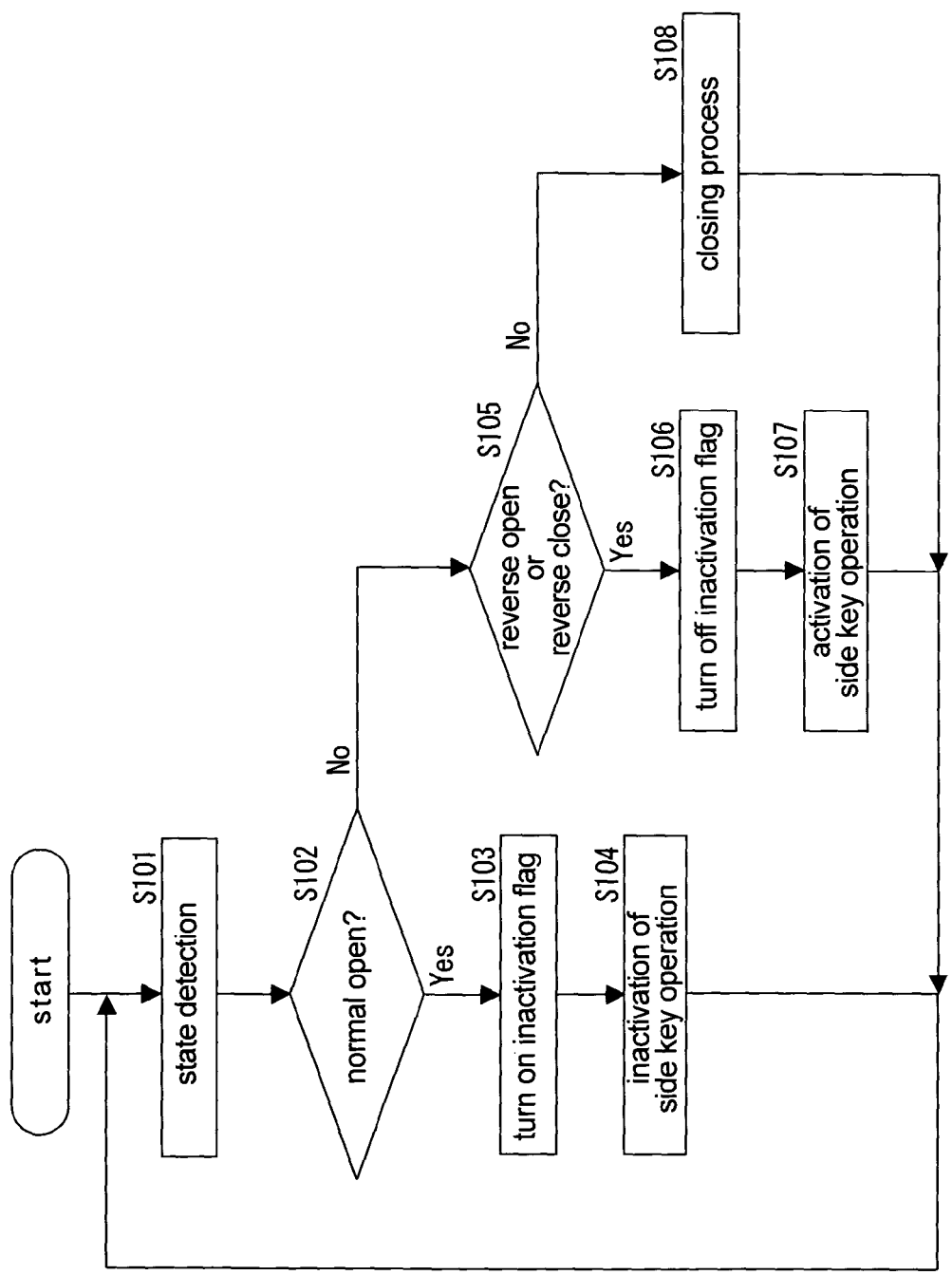
FIG. 15 is a flowchart showing an example of an input control related to side operation keys 25 to 27 in the mobile telephone 100 of FIG. 1.
Figure 16:
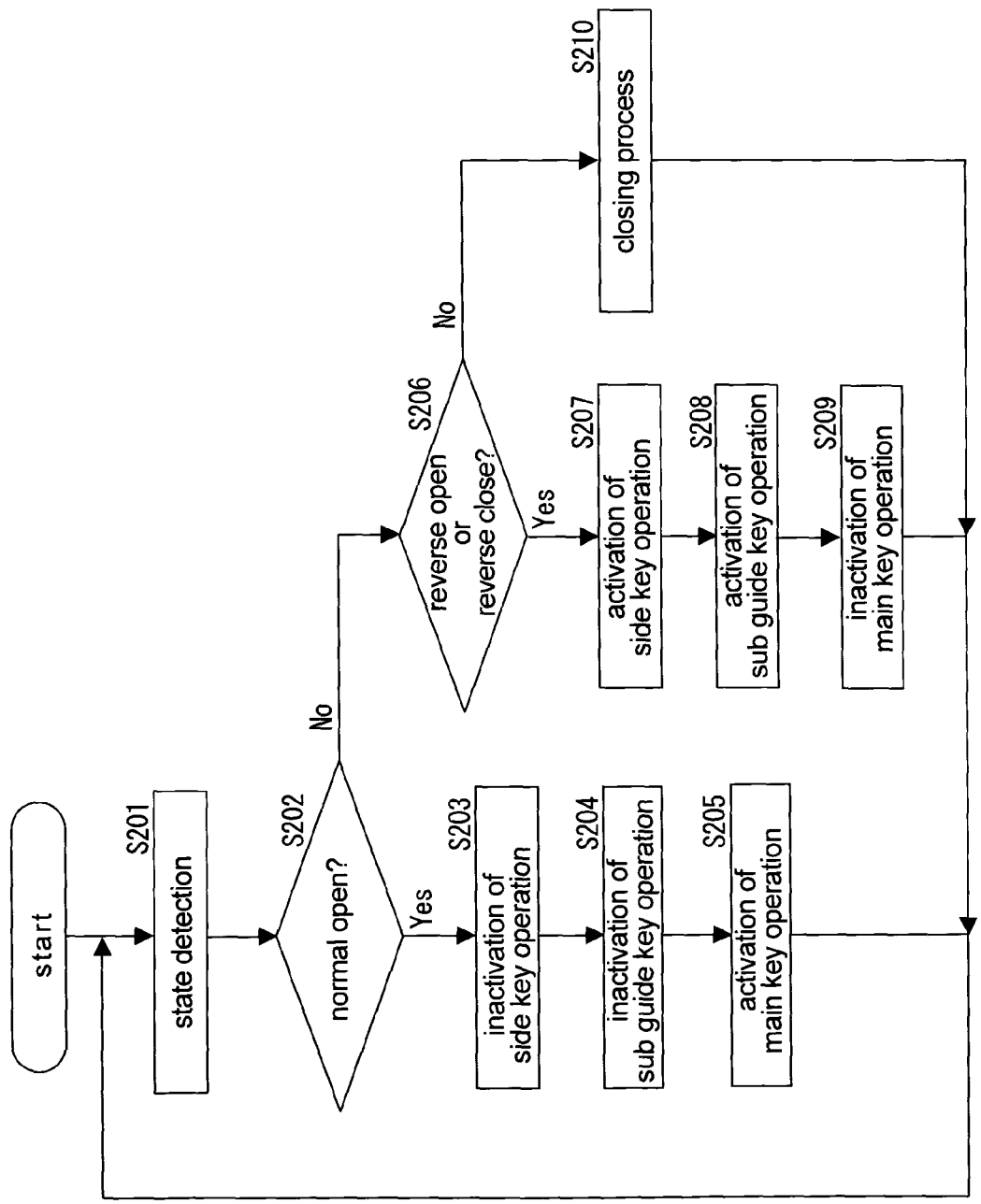
FIG. 16 is a flowchart showing an example of the input control according to a second embodiment of the present invention.
Figure 17:
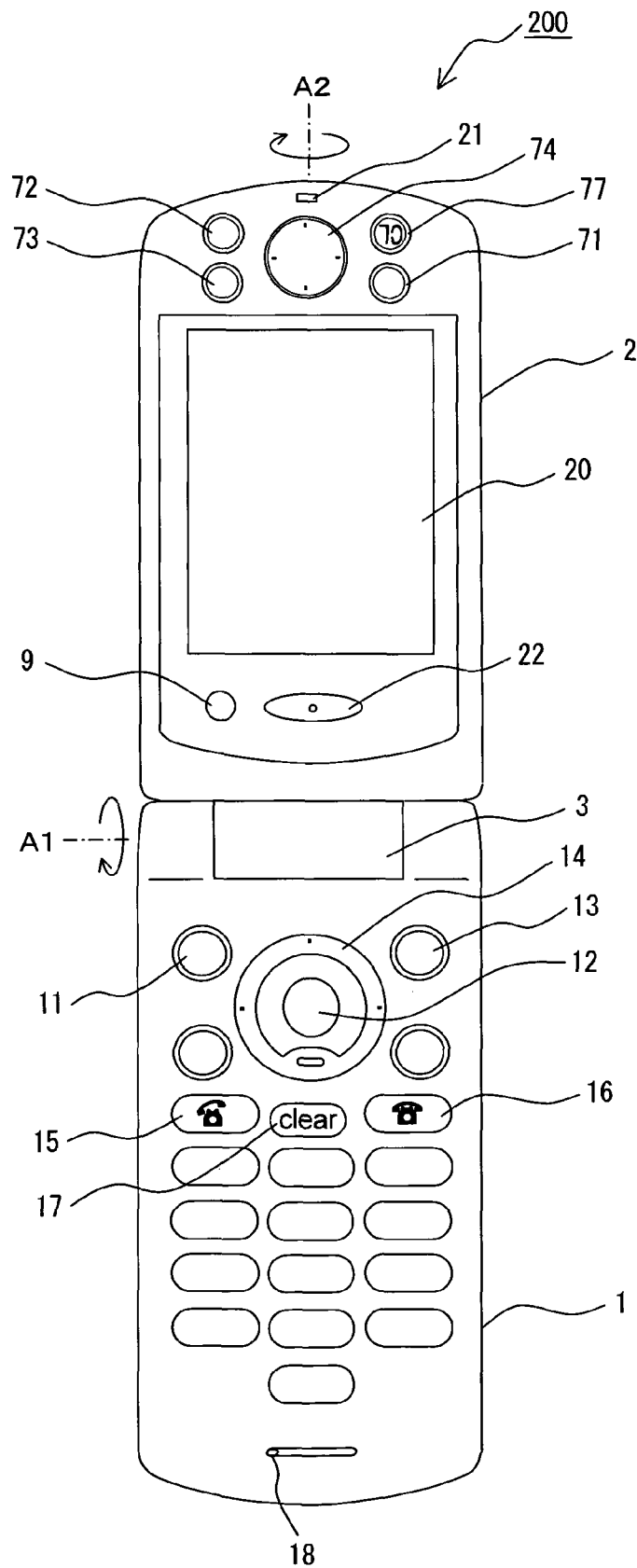
FIG. 17 is a diagram showing appearance of a mobile telephone 200 according to a third embodiment of the present invention in the normal open state.
Figure 18:
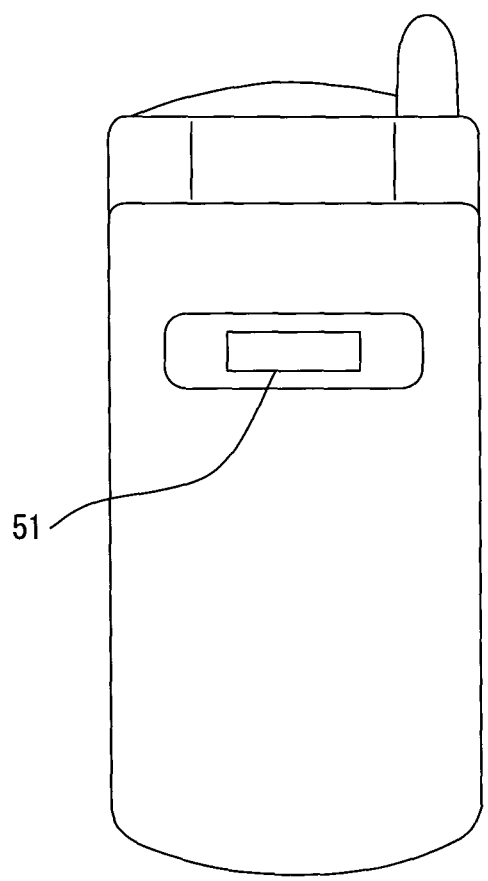
FIG. 18 is a diagram showing appearance of the mobile telephone 200 of FIG. 17 in the normal close state.
Figure 19:
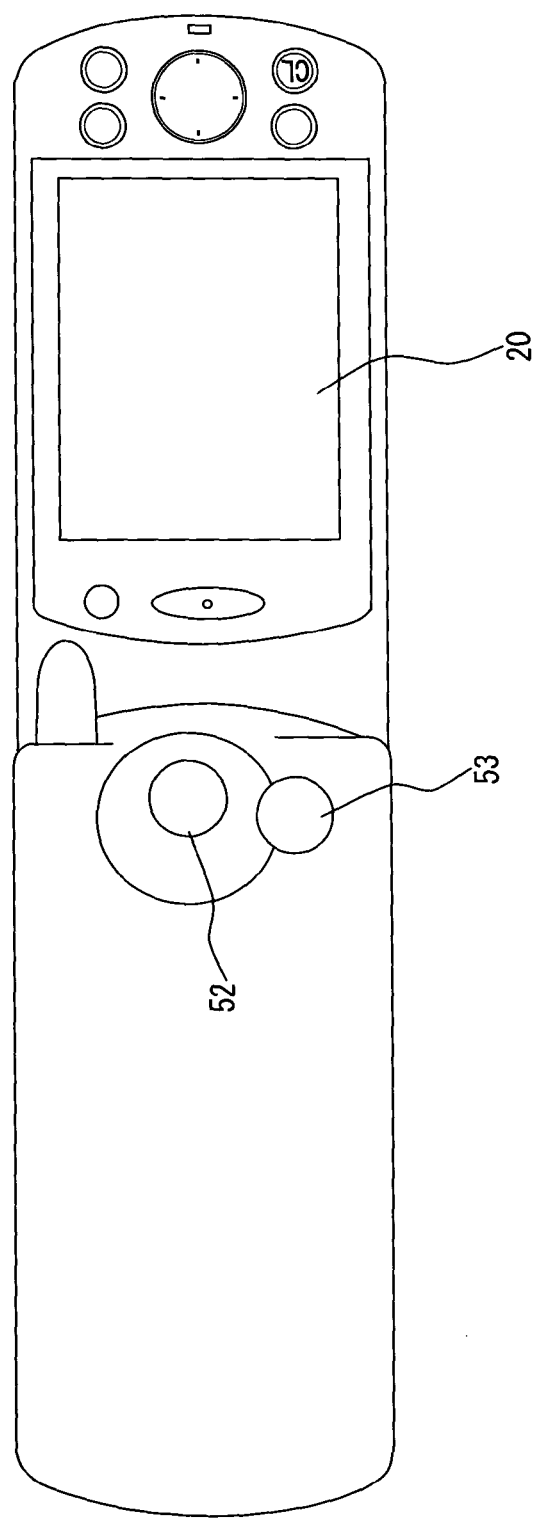
FIG. 19 is a diagram showing appearance of the mobile telephone 200 of FIG. 17 in the reverse open state.
Figure 20:
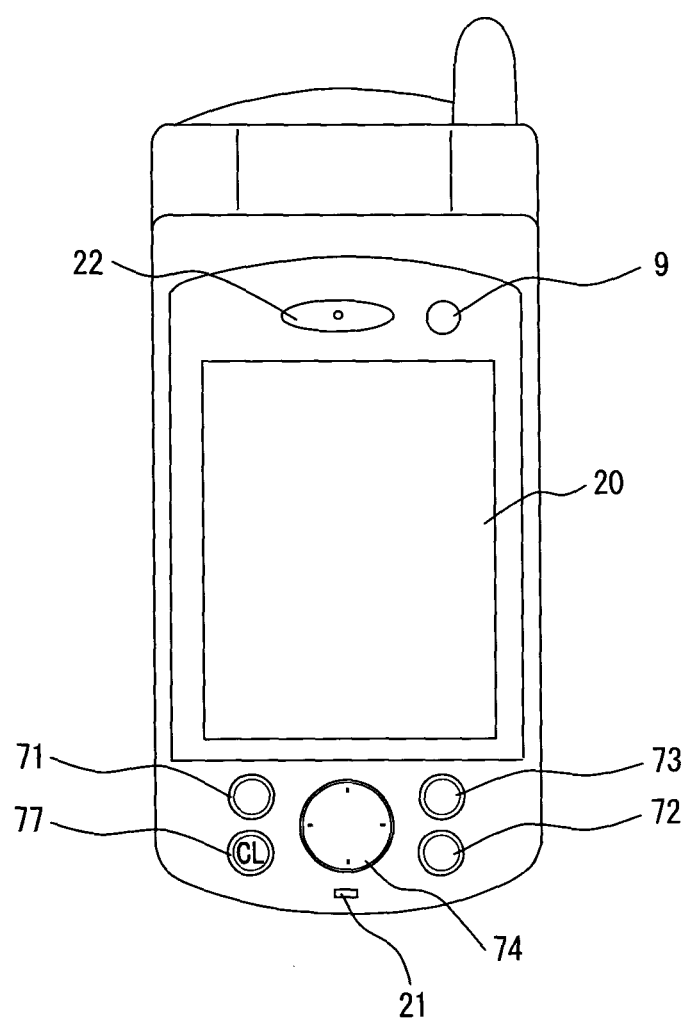
FIG. 20 is a diagram showing appearance of the mobile telephone 200 of FIG. 17 in the reverse close state.
Figure 21:
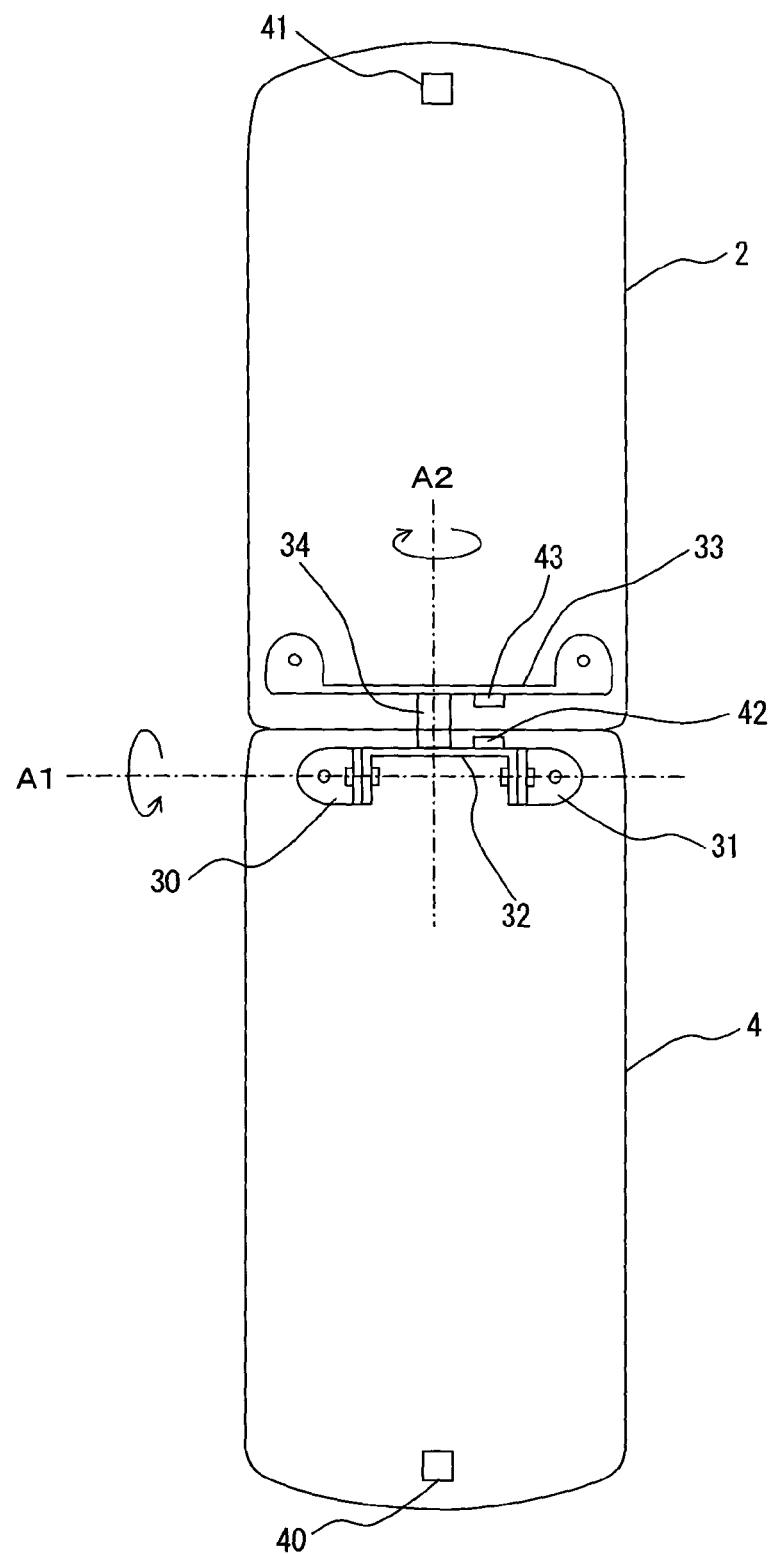
FIG. 21 is a diagram showing an example of the internal mechanical structure of the mobile telephone 200 of FIG. 17.
Figure 22:
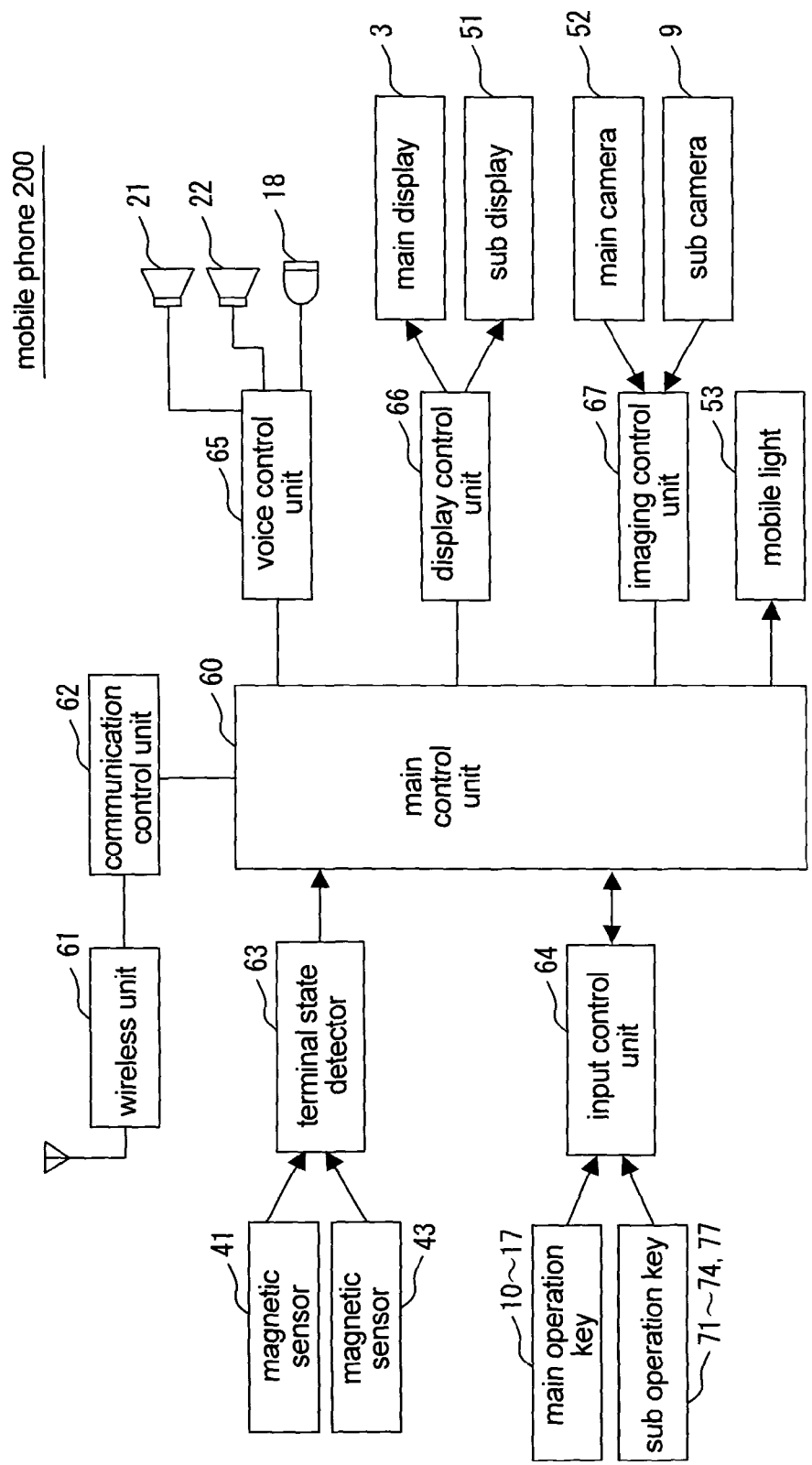
FIG. 22 is a block diagram showing an example of the internal electrical configuration of the mobile telephone 200 of FIG. 17.
Figure 23:
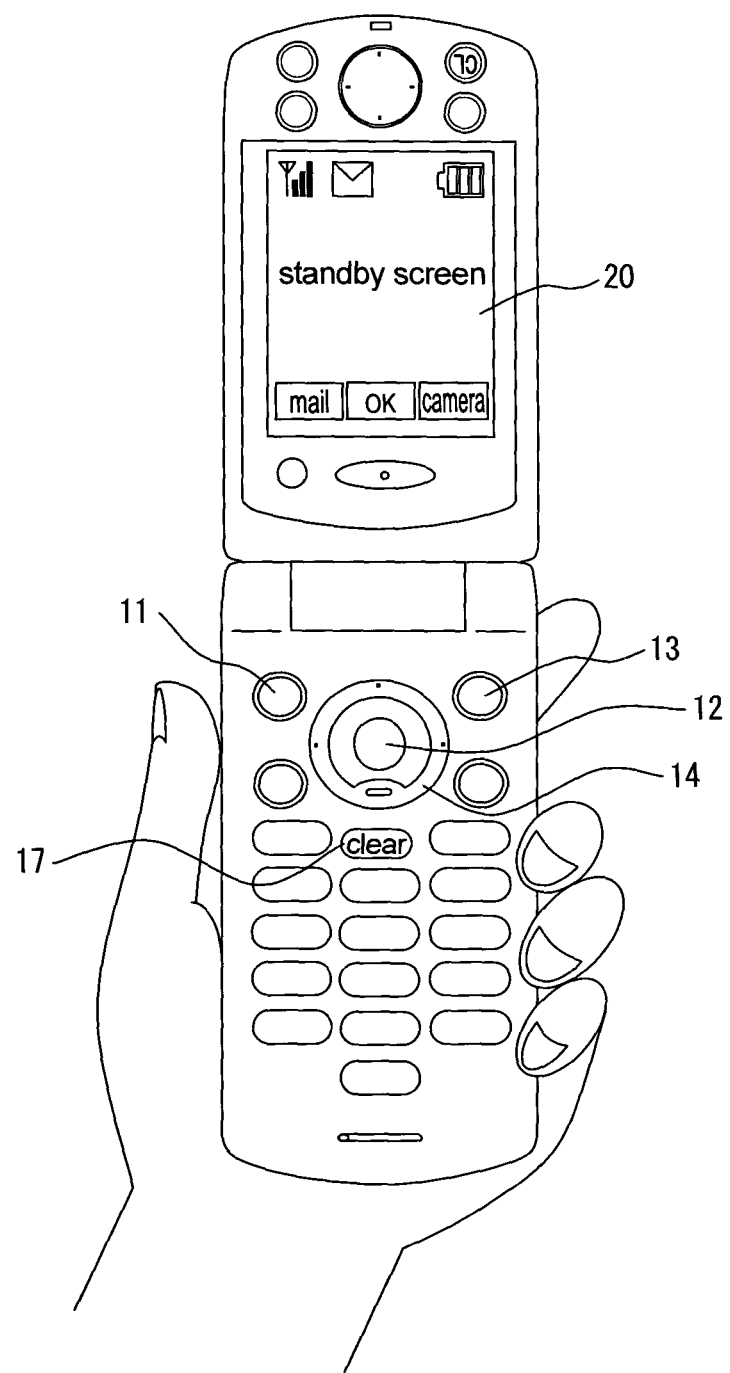
FIG. 23 is a diagram showing the state of the mobile telephone 200 of FIG. 17 on standby in the normal open state.
Figure 24:
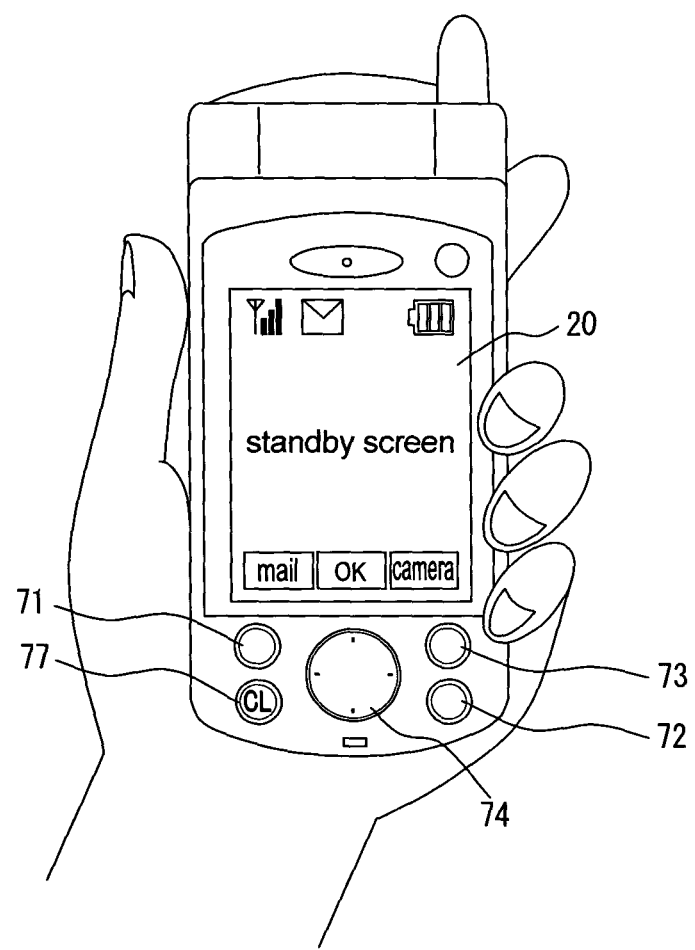
FIG. 24 is a diagram showing the state of the mobile telephone 200 of FIG. 17 on standby in the reverse close state.
Figure 25:
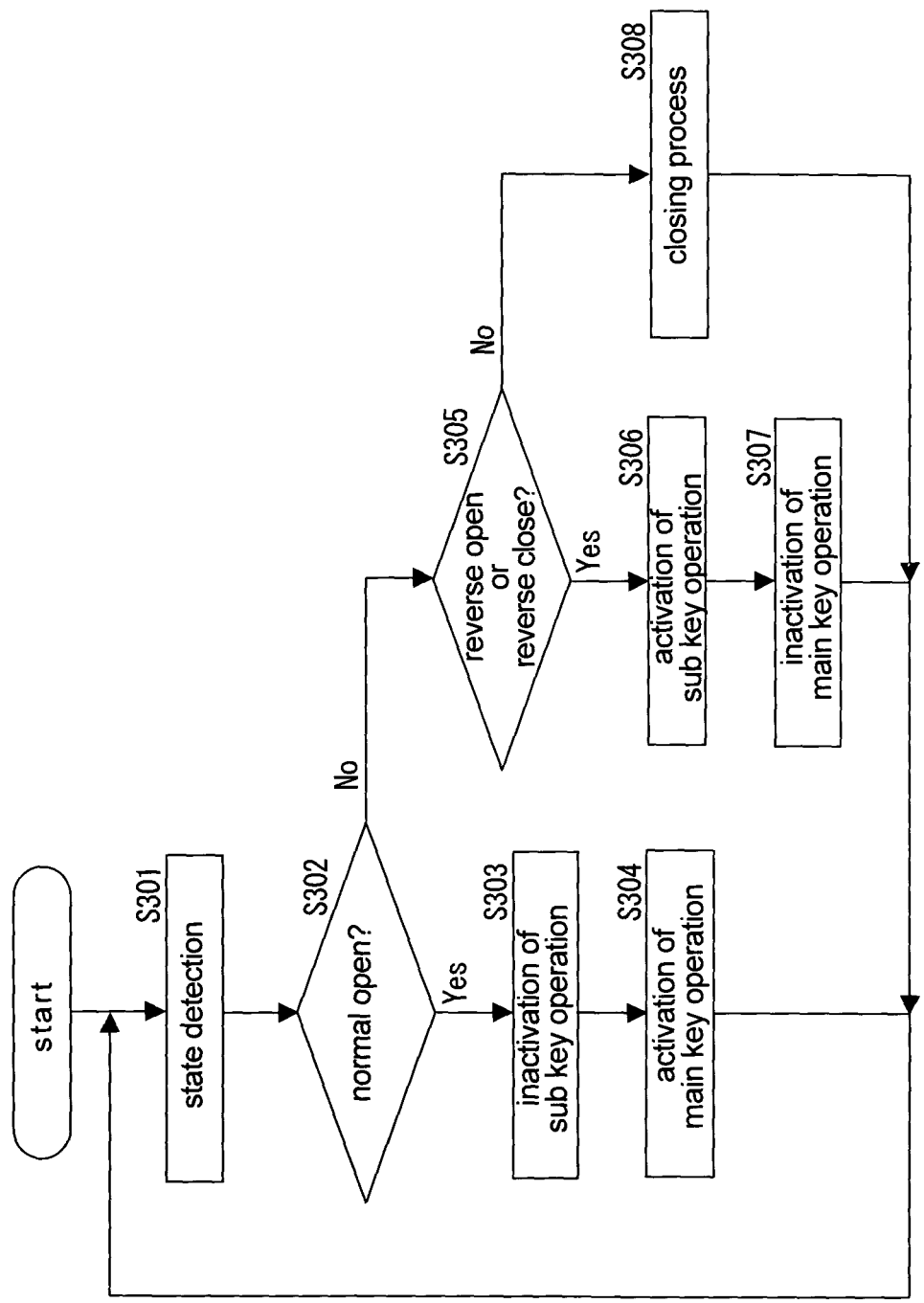
FIG. 25 is a flowchart showing an example of the input control related to main operation keys 10 to 17, sub operation keys 71 to 74 and 77 in the mobile telephone 200 of FIG. 17.
Figure 26:
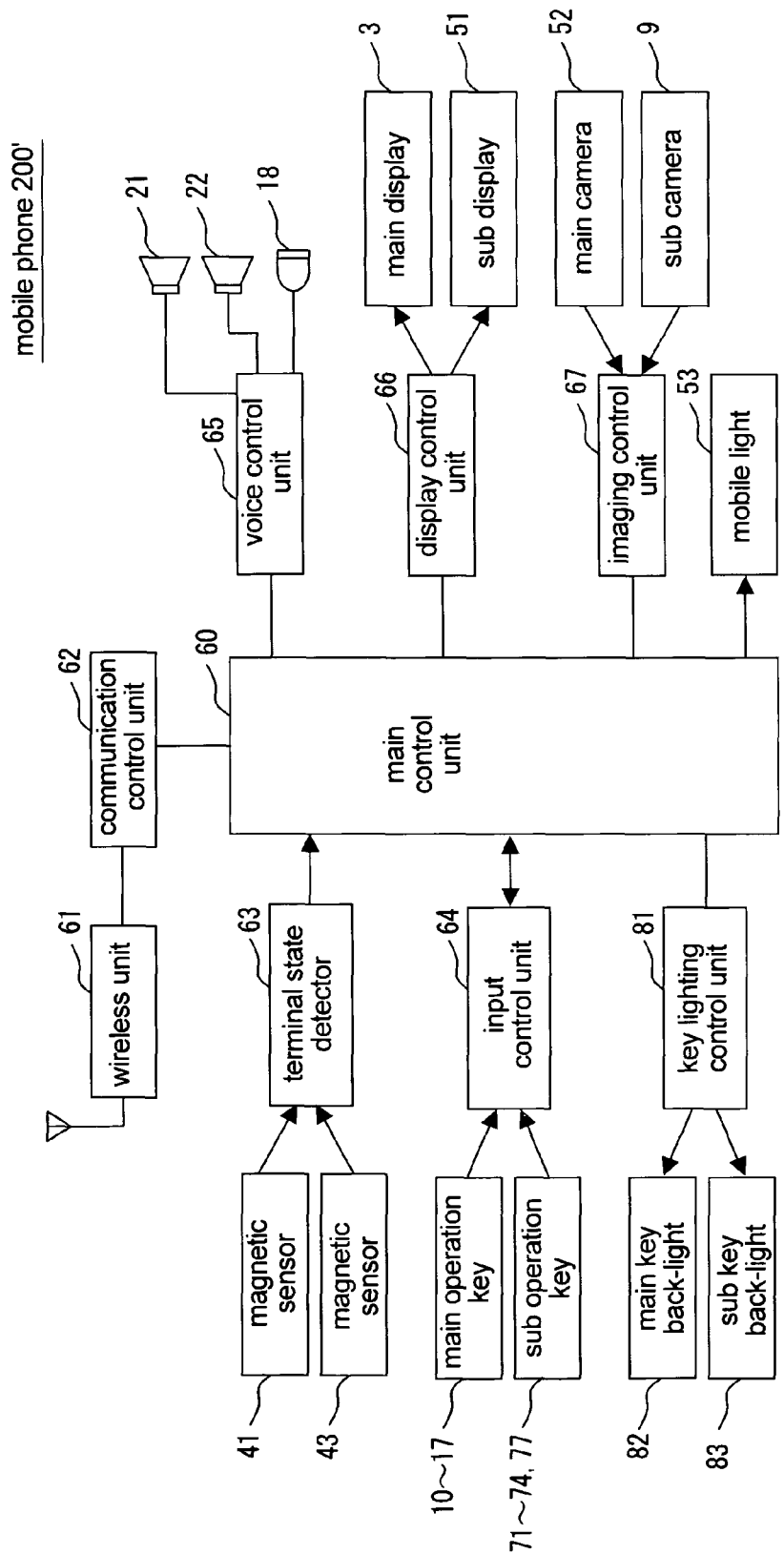
FIG. 26 is a block diagram showing another example of the internal electrical configuration of the mobile telephone of FIG. 17 (fourth embodiment).
Figure 27:
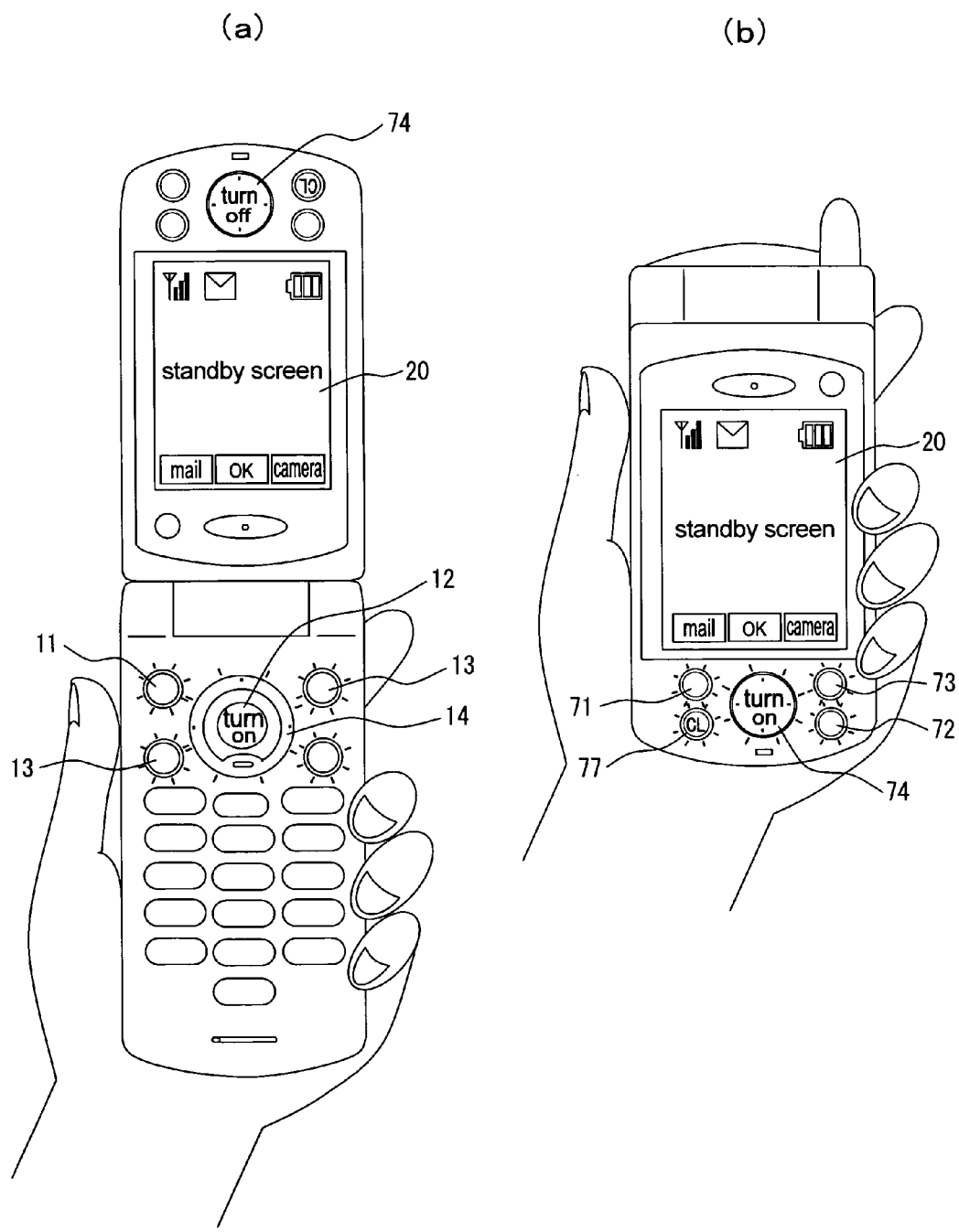
FIG. 27 is a diagram showing an example of an operation on standby in a mobile telephone 200' of FIG. 26.
Figure 28:
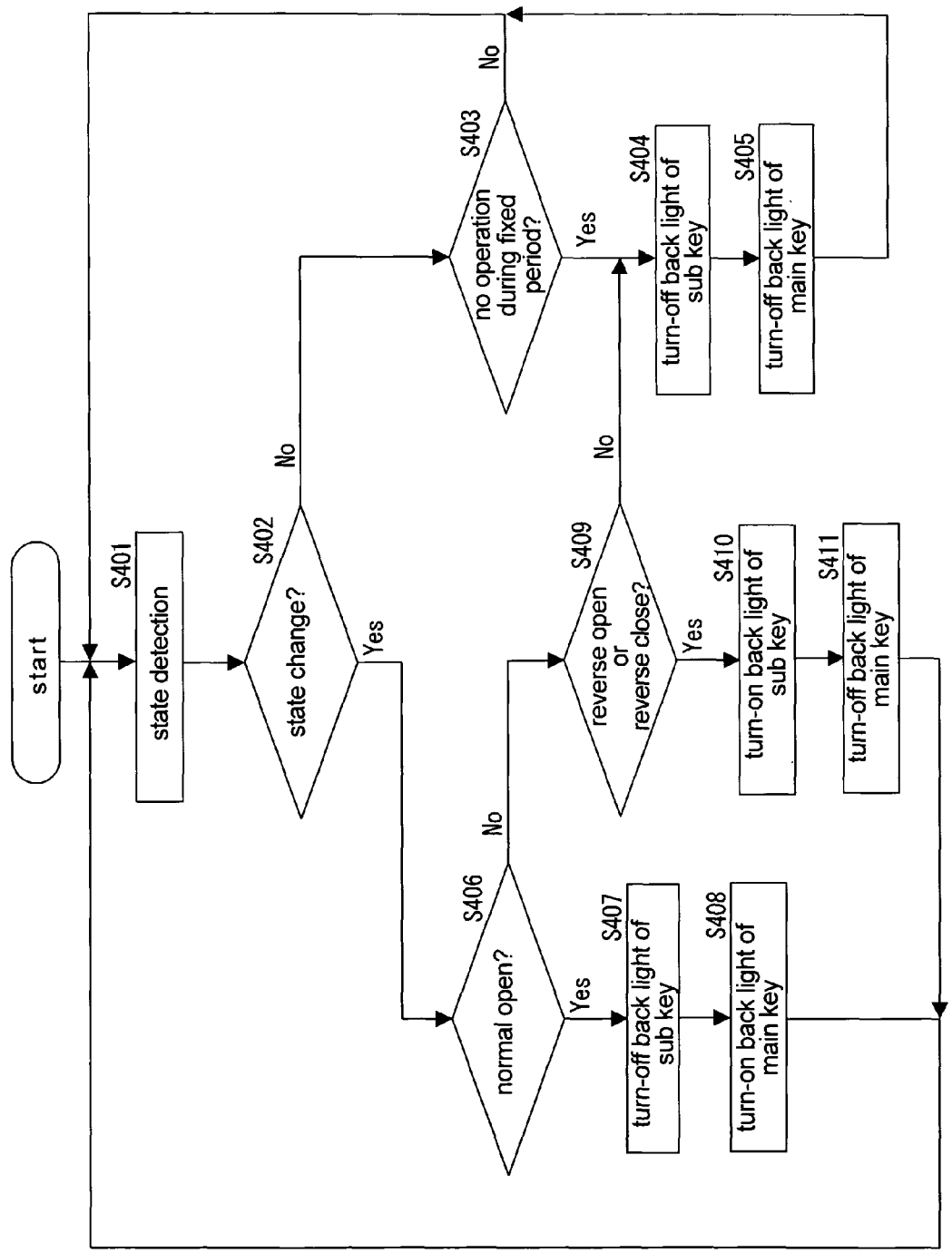
FIG. 28 is a flowchart showing an example of a lighting control of key back lights 82 and 83 in the mobile telephone 200' of FIG. 26.
Figure 29:
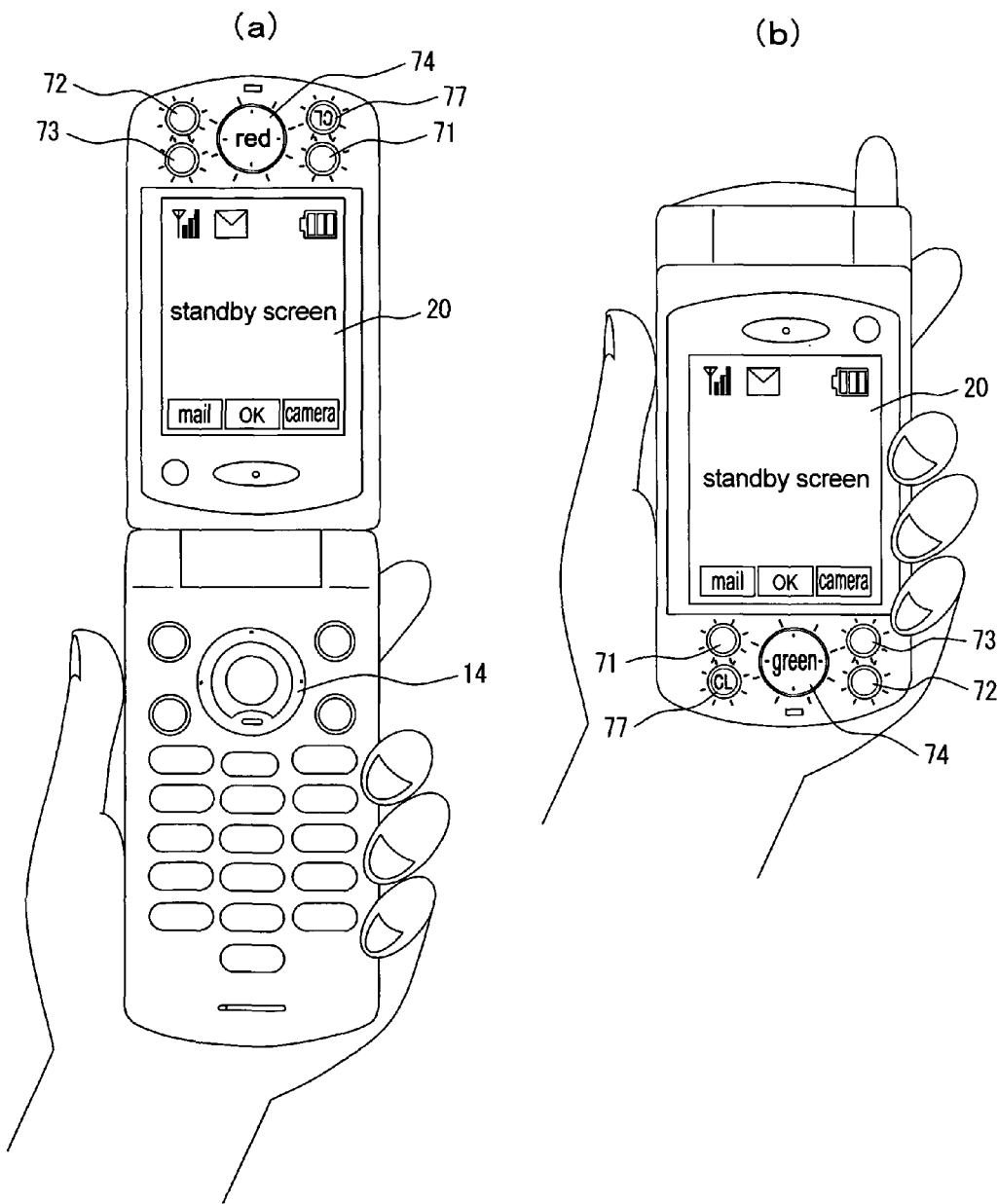
FIG. 29 is a diagram showing an example of an operation on standby in the mobile telephone 200' of FIG. 26-(fifth embodiment).
Figure 30:
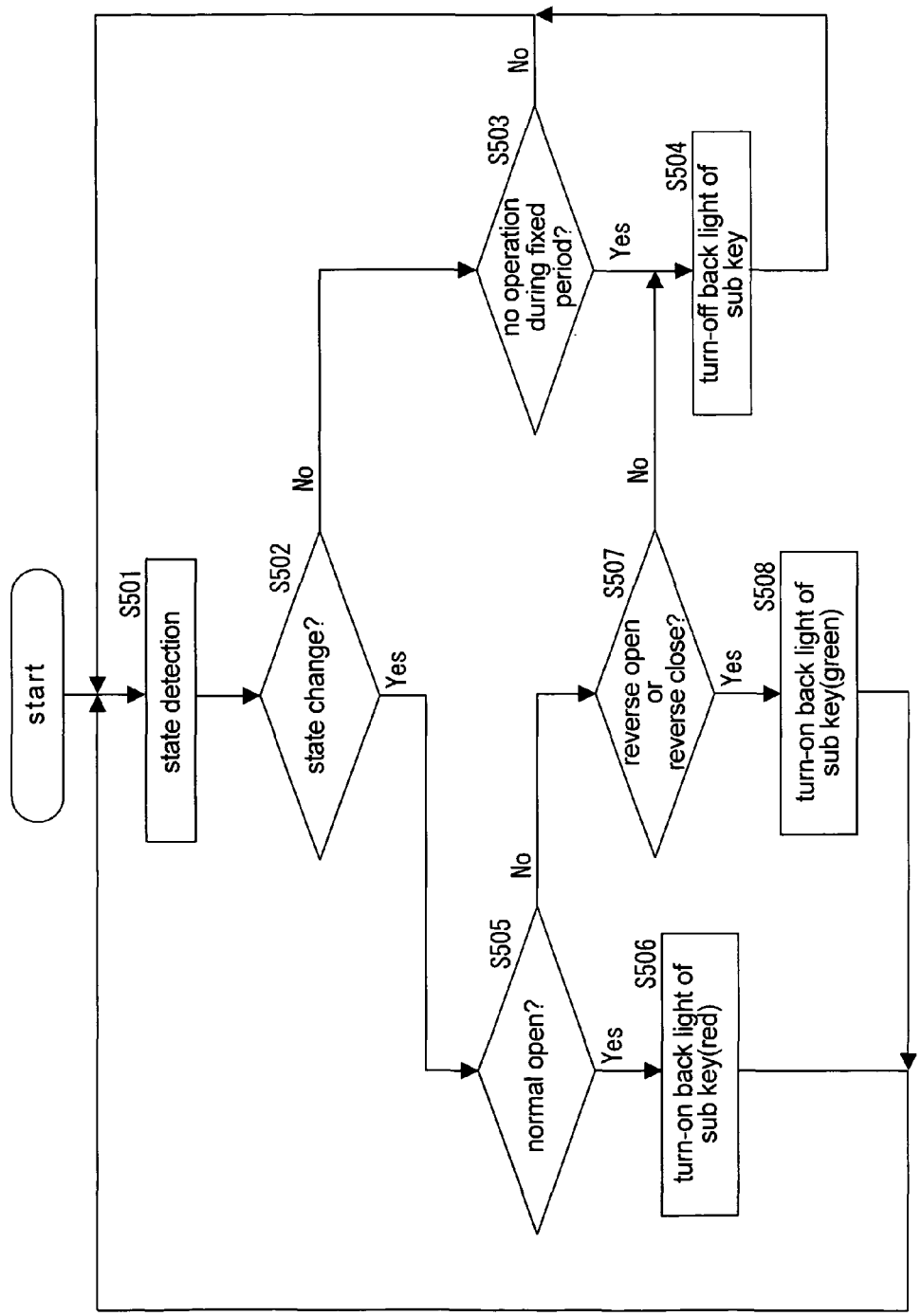
FIG. 30 is a flowchart showing an example of the lighting control of a sub key back light 83 in the mobile telephone 200' of FIG. 26.

1 Operation case
2 Display case

3 Movable connector
11 to 13 Main guide key
14 Main multifunction key
15 Off-hook key
16 On-hook key
17 Main clear key
20 Main display
23, 24 Sub guide key
25 Side guide key
26 Side multifunction key
27 Side clear key
63 Terminal state detector
64 Input control unit
71 to 73 Sub guide key
74 Sub multifunction key
77 Sub clear key
100, 200 Mobile telephone
A1, A2 Rotating axis

The invention claimed is:

1. A mobile communication terminal having a thin operation case with an operation panel formed on one main surface thereof, a display case with a display panel formed on one main surface thereof, and a movable connector to connect said operation case and said display case, and being capable of making transition between a normal open state of expanding said both cases by directing said operation panel and said display panel to the same direction, and a reverse close state of folding said both cases with main surfaces faced to each other by directing said display panel outward, and comprising an on-hook key provided on said operation panel, a main guide key provided on said operation panel and having a function assignment displayed in said display panel, and a sub guide key provided on said display panel, wherein an on-hook function is assigned to said sub guide key during a telephone call in said reverse close state, and the same function with said main guide key is assigned to said sub guide key during a standby time in said reverse close state.

2. A mobile communication terminal having a thin operation case with an operation panel formed on one main surface thereof, a display case with a display panel formed on one main surface thereof, and a movable connector to connect said operation case and said display case, and being capable of making transition between a normal open state of expanding said both cases by directing said operation panel and said display panel to the same direction, and a reverse close state of folding said both cases with main surfaces faced to each other by directing said display panel outward, and comprising an off-hook key provided on said operation panel, a main guide key provided on said operation panel and having a function assignment displayed in said display panel, and a sub guide key provided on said display panel, wherein an off-hook function is assigned to said sub guide key during an incoming telephone call in said reverse close state, and the same function with said main guide key is assigned to said sub guide key during a standby time in said reverse close state.

3. A mobile communication terminal having a thin operation case with an operation panel formed on one main surface thereof, a display case with a display panel formed on one main surface thereof, and a movable connector to connect said operation case and said display case, and being capable of making transition between a normal open state of expanding said both cases by directing said operation panel and said display panel to the same direction, and a reverse close state of folding said both cases with main surfaces faced to each other by directing said display panel outward, and comprising an off-hook key provided on said operation panel, a main guide key provided on said operation panel and having a function assignment displayed in said display panel, and a sub guide key provided on said display panel, wherein an off-hook function is assigned to said sub guide key in the case of making transition to said reverse close state after inputting a number in said normal open state, and the same function with said main guide key is assigned to said sub guide key during a standby time in said reverse close state.

* * * * *